US008564281B2

(12) United States Patent
Filatov

(10) Patent No.: US 8,564,281 B2
(45) Date of Patent: Oct. 22, 2013

(54) NONCONTACT MEASURING OF THE POSITION OF AN OBJECT WITH MAGNETIC FLUX

(75) Inventor: Alexei V. Filatov, Fullerton, CA (US)

(73) Assignee: Calnetix Technologies, L.L.C., Yorba Linda, CA (US)

( * ) Notice: Subject to any disclaimer, the term of this patent is extended or adjusted under 35 U.S.C. 154(b) by 932 days.

(21) Appl. No.: 12/475,052

(22) Filed: May 29, 2009

(65) Prior Publication Data
US 2010/0301840 A1 Dec. 2, 2010

(51) Int. Cl.
*G01B 7/14* (2006.01)

(52) U.S. Cl.
USPC ............... 324/207.2; 324/207.24; 324/207.17

(58) Field of Classification Search
USPC ............................ 324/207.2, 207.15–207.25
See application file for complete search history.

(56) References Cited

U.S. PATENT DOCUMENTS

| | | | |
|---|---|---|---|
| 1,916,256 A | 7/1933 | Chandeysson | |
| 2,276,695 A | 3/1942 | Lavarello | |
| 2,345,835 A | 4/1944 | Serduke | |
| 2,409,857 A | 10/1946 | Hines et al. | |
| 2,917,636 A | 12/1959 | Akeley | |
| 3,060,335 A | 10/1962 | Greenwald | |
| 3,064,942 A | 11/1962 | Martin | |
| 3,243,692 A * | 3/1966 | Heissmeier et al. | 340/870.38 |
| 3,439,201 A | 4/1969 | Levy et al. | |
| 3,943,443 A | 3/1976 | Kimura et al. | |
| 4,093,917 A * | 6/1978 | Haeussermann | 324/173 |
| 4,127,786 A | 11/1978 | Volkrodt | |
| 4,170,435 A | 10/1979 | Swearingen | |
| 4,260,914 A | 4/1981 | Hertrich | |
| 4,358,697 A | 11/1982 | Liu et al. | |
| 4,362,020 A | 12/1982 | Meacher et al. | |
| 4,415,024 A | 11/1983 | Baker | |
| 4,535,289 A * | 8/1985 | Abe et al. | 324/207.14 |
| 4,560,928 A * | 12/1985 | Hayward | 324/172 |

(Continued)

FOREIGN PATENT DOCUMENTS

DE 102006004836 A1 5/2007
EP 0774824 5/1997

(Continued)

OTHER PUBLICATIONS

U.S. Appl. No. 13/116,991, filed May 26, 2011, Filatov.

(Continued)

*Primary Examiner* — Jay Patidar
(74) *Attorney, Agent, or Firm* — Fish & Richardson P.C.

(57) ABSTRACT

Noncontact measuring of positions of objects is achieved through measurements of parameters characterized by the distribution of an AC magnetic flux in the air gap between stationary and moveable portions defining a sensor magnetic circuit. A sensor head fixed relative to a stationary element includes a soft-magnetic core. A sensor target is fixed relative to a movable element, the soft-magnetic core and the sensor target separated by an air gap and defining a magnetic circuit. A coil around the soft-magnetic core is adapted to produce a magnetic flux in the magnetic circuit. A magnetic flux density sensor fixed relative to the sensor head resides in the gap between the soft-magnetic core and the sensor target and is configured to detect magnetic flux density in a portion of the gap. A controller in communication with the magnetic flux density sensor is configured to receive an output signal of the magnetic flux.

28 Claims, 18 Drawing Sheets

(56) References Cited

U.S. PATENT DOCUMENTS

| | | | |
|---|---|---|---|
| 4,635,712 | A | 1/1987 | Baker et al. |
| 4,639,665 | A * | 1/1987 | Gary .................. 324/117 H |
| 4,642,501 | A | 2/1987 | Kral et al. |
| 4,659,969 | A | 4/1987 | Stupak |
| 4,731,579 | A * | 3/1988 | Petersen et al. .......... 324/207.24 |
| 4,740,711 | A | 4/1988 | Sato et al. |
| 4,806,813 | A * | 2/1989 | Sumi et al. ............. 310/216.036 |
| 4,948,348 | A | 8/1990 | Doll et al. |
| 5,003,211 | A | 3/1991 | Groom |
| 5,083,040 | A | 1/1992 | Whitford et al. |
| 5,115,192 | A * | 5/1992 | Bardas et al. ............ 324/207.12 |
| 5,241,425 | A | 8/1993 | Sakamoto et al. |
| 5,315,197 | A | 5/1994 | Meeks et al. |
| 5,481,145 | A | 1/1996 | Canders et al. |
| 5,514,924 | A | 5/1996 | McMullen et al. |
| 5,559,379 | A | 9/1996 | Voss |
| 5,589,262 | A | 12/1996 | Kiuchi et al. |
| 5,627,420 | A | 5/1997 | Rinker et al. |
| 5,672,047 | A | 9/1997 | Birkholz |
| 5,739,606 | A | 4/1998 | Takahata et al. |
| 5,767,597 | A | 6/1998 | Gondhalekar |
| 5,831,431 | A * | 11/1998 | Gottfried-Gottfried et al. .............................. 324/239 |
| 5,939,879 | A * | 8/1999 | Wingate et al. .......... 324/207.17 |
| 5,942,829 | A | 8/1999 | Huynh |
| 5,994,804 | A | 11/1999 | Grennan et al. |
| 6,087,744 | A | 7/2000 | Glauning |
| 6,130,494 | A | 10/2000 | Schöb |
| 6,148,967 | A | 11/2000 | Huynh |
| 6,167,703 | B1 | 1/2001 | Rumez et al. |
| 6,191,511 | B1 | 2/2001 | Zysset |
| 6,259,179 | B1 | 7/2001 | Fukuyama et al. |
| 6,268,673 | B1 | 7/2001 | Shah et al. |
| 6,270,309 | B1 | 8/2001 | Ghetzler et al. |
| 6,304,015 | B1 | 10/2001 | Filatov et al. |
| 6,313,555 | B1 | 11/2001 | Blumenstock et al. |
| 6,325,142 | B1 | 12/2001 | Bosley et al. |
| 6,359,357 | B1 | 3/2002 | Blumenstock |
| 6,437,468 | B2 | 8/2002 | Stahl et al. |
| 6,465,924 | B1 | 10/2002 | Maejima |
| 6,664,680 | B1 | 12/2003 | Gabrys |
| 6,700,258 | B2 | 3/2004 | McMullen et al. |
| 6,727,617 | B2 | 4/2004 | McMullen et al. |
| 6,794,780 | B2 | 9/2004 | Silber et al. |
| 6,856,062 | B2 | 2/2005 | Heiberger et al. |
| 6,876,194 | B2 | 4/2005 | Lin et al. |
| 6,885,121 | B2 | 4/2005 | Okada et al. |
| 6,897,587 | B1 | 5/2005 | McMullen et al. |
| 6,925,893 | B2 | 8/2005 | Abe et al. |
| 6,933,644 | B2 | 8/2005 | Kanebako |
| 7,042,118 | B2 | 5/2006 | McMullen et al. |
| 7,135,857 | B2 * | 11/2006 | Johnson .................... 324/207.2 |
| 7,557,480 | B2 | 7/2009 | Filatov |
| 7,635,937 | B2 | 12/2009 | Brunet et al. |
| 8,169,118 | B2 | 5/2012 | Filatov |
| 2001/0030471 | A1 | 10/2001 | Kanebako |
| 2002/0006013 | A1 | 1/2002 | Sato et al. |
| 2002/0175578 | A1 | 11/2002 | McMullen et al. |
| 2003/0155829 | A1 | 8/2003 | McMullen et al. |
| 2005/0093391 | A1 | 5/2005 | McMullen et al. |
| 2007/0056285 | A1 | 3/2007 | Brewington |
| 2007/0063594 | A1 | 3/2007 | Huynh |
| 2007/0164627 | A1 | 7/2007 | Brunet et al. |
| 2007/0200438 | A1 | 8/2007 | Kaminski et al. |
| 2007/0296294 | A1 | 12/2007 | Nobe et al. |
| 2008/0211355 | A1 | 9/2008 | Sakamoto et al. |
| 2008/0246373 | A1 | 10/2008 | Filatov |
| 2008/0252078 | A1 | 10/2008 | Myers |
| 2009/0004032 | A1 | 1/2009 | Kaupert |
| 2009/0201111 | A1 | 8/2009 | Filatov |
| 2010/0090556 | A1 | 4/2010 | Filatov |
| 2010/0117627 | A1 | 5/2010 | Filatov |
| 2011/0101905 | A1 | 5/2011 | Filatov |
| 2011/0163622 | A1 | 7/2011 | Filatov et al. |
| 2011/0234033 | A1 | 9/2011 | Filatov |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |

OTHER PUBLICATIONS

U.S. Appl. No. 13/045,379, filed Mar. 10, 2011, Filatov.

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.it/orc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Honeywell, "Genetron® 245fa Applications Development Guide," (15 pages), 2000.

Hawkins, Lawrence A. et al., "*Analysis and Testing of a Magnetic Bearing Energy Storage Flywheel with Gain-Scheduled, Mimo Control*," Proceedings of ASME Turboexpo 2000, Munich, Germany, May 8-11, 2000, pp. 1-8.

McMullen, Patrick T. et al., "*Combination Radial-Axial Magnetic Bearing*," Seventh International Symposium on Magnetic Bearings, ETH Zurich, Aug. 23-25, 2000, pp. 473-478.

Hawkins, Lawrence et al., "*Shock and Vibration Testing of an AMB Supported Energy Storage Flywheel*," 8th International Symposium on Magnetic Bearings, Mito, Japan, Aug. 26-28, 2002, 6 pages.

McMullen, Patrick T. et al., "*Design and Development of a 100 KW Energy Storage Flywheel for UPS and Power Conditioning Applications*," 24th International PCIM Conference, Nuremberg, Germany, May 20-22, 2003, 6 pages.

Hawkins, Larry et al., "*Development of an AMB Energy Storage Flywheel for Industrial Applications*," 7th International Symposium on Magnetic Suspension Technology, Fukoka, Japan, Oct. 2003, 5 pages.

Freepower FP6,. "Freepower FP6 Specification & Dimensions for 6kWe Electricity Generating Equipment," (2 pages), 2000-2004, printed Jul. 26, 2006.

Hawkins, Larry et al., "*Development of an AMB Energy Storage Flywheel for Commercial Application*," International Symposium on Magnetic Suspension Technology, Dresden, Germany, Sep. 2005, 5 pages.

Freepower ORC Electricity Company with Industrial Processes, "Industrial Processes," (1 page), available at http://www.freepower.co.uk/site-5.htm, 2000-2006, printed Jul. 26, 2006.

Freepower ORC Electricity Company FP6 Product Description, "FP6," (1 page), available at http://www.freepower.co.uk/fp6.htm, 2000-2006, printed Jul. 26, 2006.

Freepower ORC Electricity Company FP120 Product Description, "FP120," (1 page), available at http://www.freepower.co.uk/fp120.htm, 2000-2006, printed Jul. 26, 2006.

Freepower ORC Electricity Company FP60 Product Description, "FP60," (1 page), available at http://www.freepower.co.uk/fp60.htm, 2000-2006, printed Jul. 26, 2006.

Freepower ORC Electricity Company Products Technical Overview "A System Overview," (1 page), available at http://www.freepower.co.uk/tech-overview.htm, 2000-2006, printed Jul. 26, 2006.

Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.

Huynh, Co et al., "*Flywheel Energy Storage System for Naval Applications*," GT 2006-90270, Proceedings of GT 2006 ASME Turbo Expo 2006: Power for Land, Sea & Air, Barcelona, Spain, May 8-11, 2006, pp. 1-9.

(56) References Cited

OTHER PUBLICATIONS

Freepower ORC Electricity Company Home Page, "Welcome to Freepower," (1 page) available at http://www.freepower.co.uk/, Jul. 18, 2006.

PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.

Ormat Web Site: "Recovered Energy Generation in the Cement Industry," (2 pages) available at http://www.ormat.com/technology_cement_2.htm, printed Jul. 26, 2006.

McMullen, Patrick et al., "*Flywheel Energy Storage System with AMB's and Hybrid Backup Bearings*," Tenth International Symposium on Magnetic Bearings, Martigny, Switzerland, Aug. 21-23, 2006, 6 pages.

International Search Report and Written Opinion of the International Searching Authority issued in International Application No. PCT/US2009/031837 on Sep. 7, 2009; 11 pages.

International Preliminary Report on Patentability issued in International Application No. PCT/US2009/031837 on Jul. 27, 2010, 6 pages.

International Search Report and Written Opinion of the International Searching Authority issued in International Application No. PCT/US2009/058816, mailed Jun. 10, 2010, 10 pages.

International Preliminary Report on Patentability issued in International Application No. PCT/US2009/058816 on Apr. 12, 2011, 5 pages.

Meeks, Crawford, "*Development of a Compact, Lightweight Magnetic Bearing*," 26$^{th}$ Annual AIAA/SAE/ASME/ASEE Joint Propulsion Conference, Jul. 16-18, 1990, 9 pages.

Ehmann et al., "*Comparison of Active Magnetic Bearings With and Without Permanent Magnet Bias*," Ninth International Symposium on Magnetic Bearings, Lexington, Kentucky, Aug. 3-6, 2004, 6 pages.

Office Action issued in U.S. Appl. No. 12/267,517 on Mar. 28, 2011, 9 pages.

Office Action issued in U.S. Appl. No. 12/569,559 on Apr. 25, 2011, 22 pages.

Notice of Allowance issued in U.S. Appl. No. 12/569,559 on Aug. 9, 2011, 9 pages.

Notice of Allowance issued in U.S. Appl. No. 12/358,172 on Sep. 20, 2011, 10 pages.

Notice of Allowance issued in U.S. Appl. No. 12/569,559 on Jan. 27, 2012, 11 pages.

Request for Continued Examination filed in U.S. Appl. No. 12/569,559 on Nov. 9, 2011, 9 pages.

Notice of Allowance issued in U.S. Appl. No. 12/267,517 on Feb. 21, 2012, 8 pages.

Amendment filed in U.S. Appl. No. 12/267,517 on Jan. 31, 2012, 9 pages.

Notice of Allowance issued in U.S. Appl. No. 12/610,766, on Oct. 19, 2012; 7 pages.

Office Action issued in U.S. Appl. No. 13/116,991 on Oct. 26, 2012; 13 pages.

\* cited by examiner

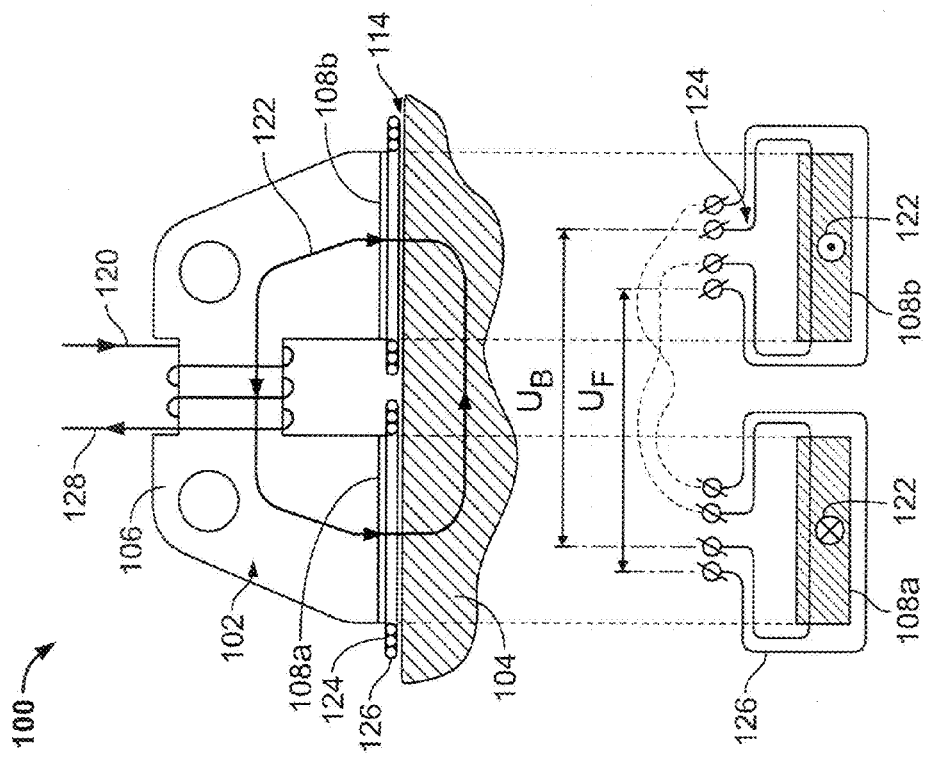
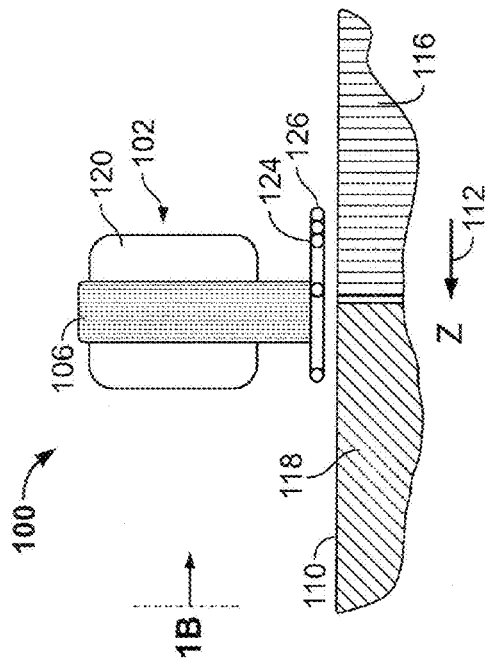

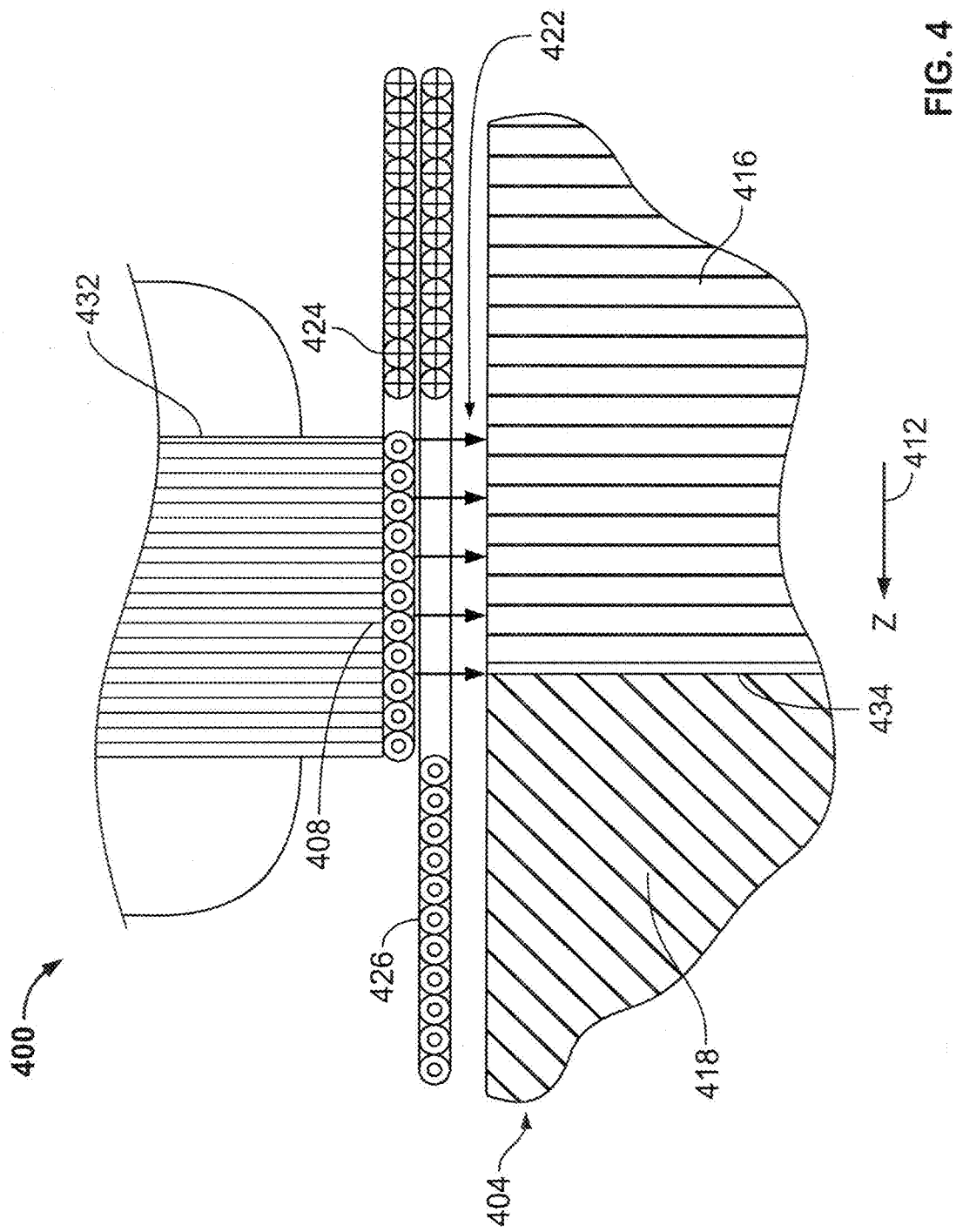

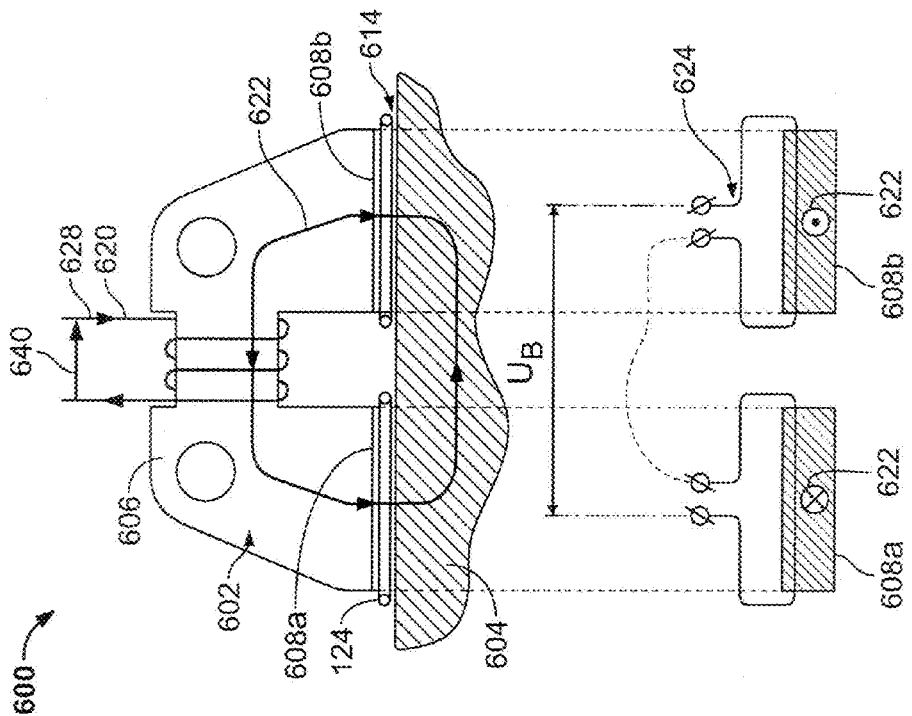
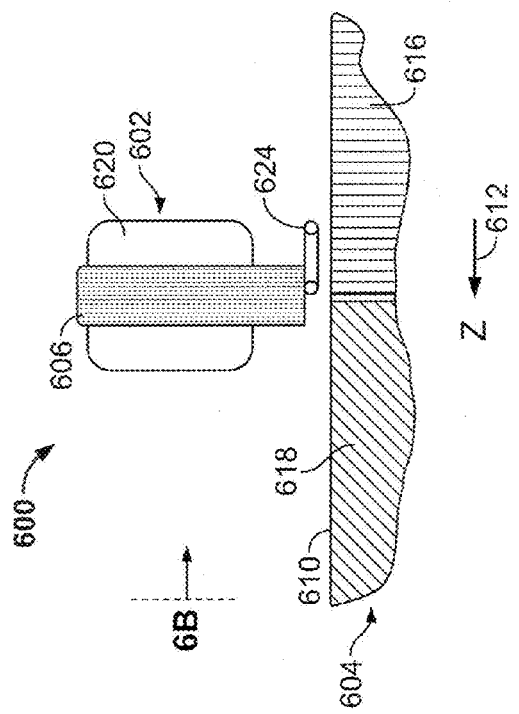
FIG. 6A
FIG. 6B

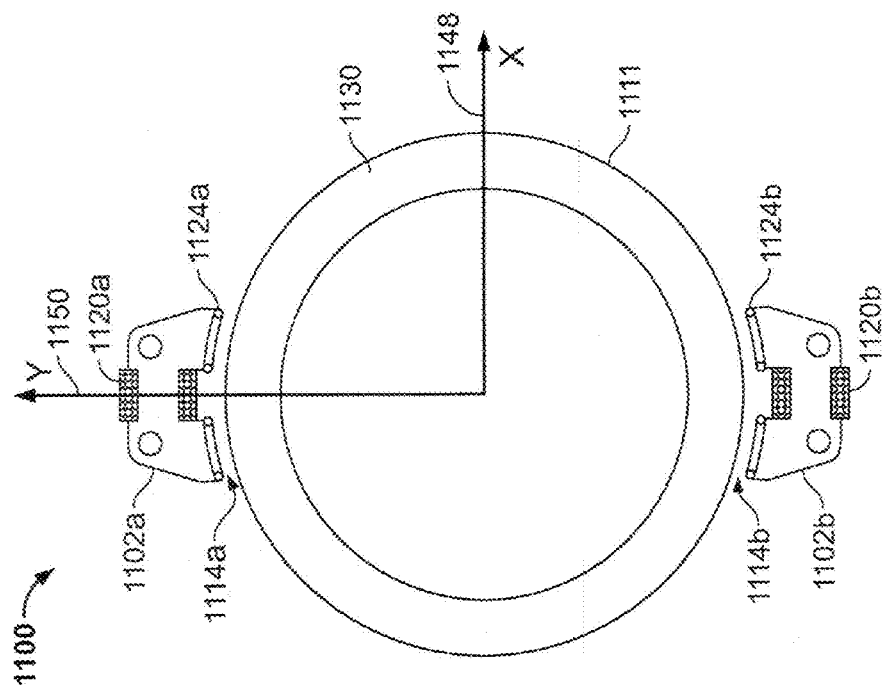
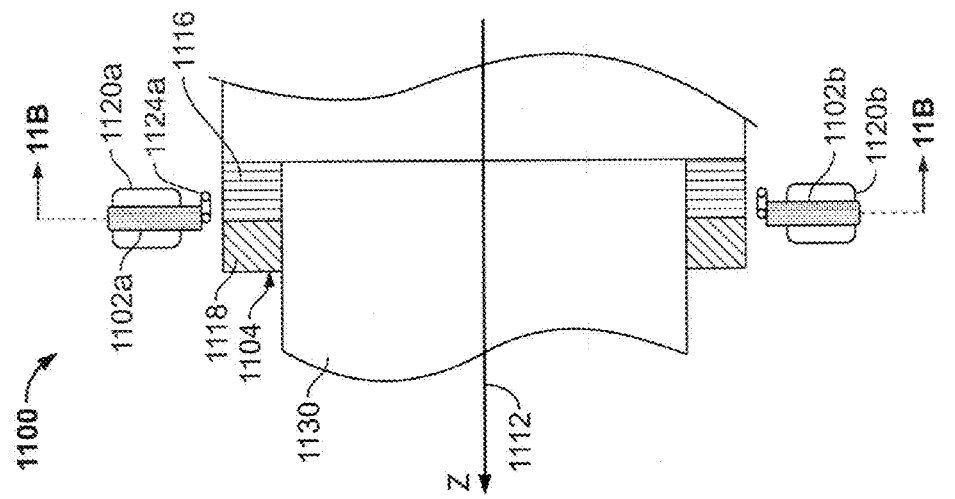

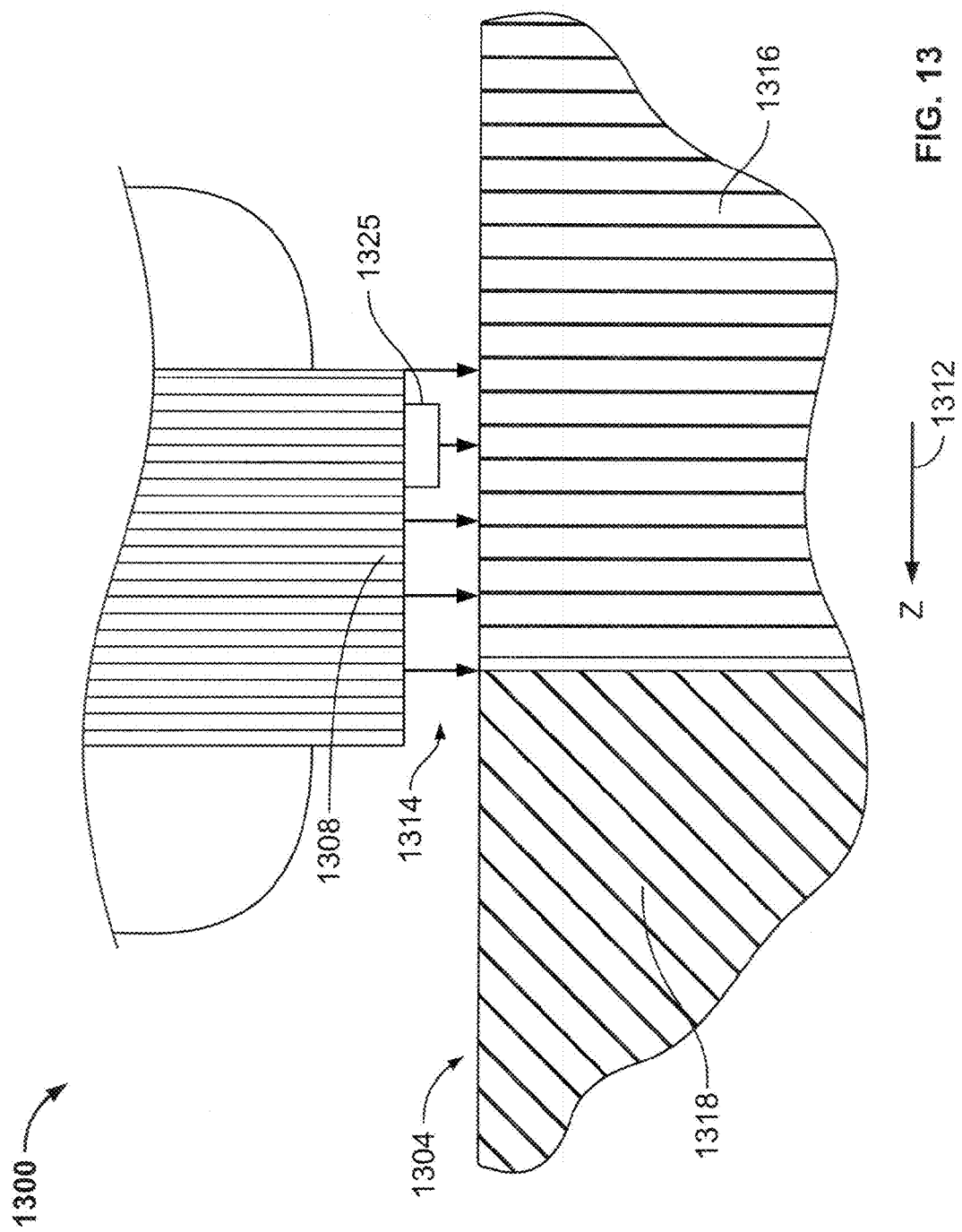

NONCONTACT MEASURING OF THE POSITION OF AN OBJECT WITH MAGNETIC FLUX

BACKGROUND

This disclosure relates to measuring positions of objects. Noncontact measuring of positions of objects is achieved through measurements of parameters characterizing the distribution of an AC magnetic field in an air gap between stationary and moveable portions of the sensor magnetic circuit.

Inductive, reluctance and eddy-current position sensors allow noncontact measurements of object positions using electromagnetic fields. These sensors consist of stationary portions commonly referred to as sensor heads and movable portions, commonly referred to as sensor targets. For example, sensors 1500a-b and 1600a-b shown in FIGS. 15a-b and FIGS. 16a-b, respectively, consist of sensor heads 1502 and 1602 and sensor targets 1504 and 1604. The sensors 1500 and 1600 serve to measure displacements of the sensor targets 1504 and 1604 along the Z-axes 1512 and 1612. The difference between the devices shown in FIGS. 15a-b and 16a-b is that in FIGS. 15a-b the distance from the sensor target 1504 to the sensor heads 1502 changes when the sensor target 1504 moves along the Z-axis 1512, whereas in FIGS. 16a-b the distance from the sensor target 1604 to the sensor heads 1602 remains the same. In order to function, however, the sensors shown in FIGS. 16a-b require the sensor target 1604 be composed of at least two parts 1616 and 1618 with different electromagnetic properties stacked in the Z-direction. The sensor heads 1502 and 1602 include at least one coil 1520 and 1620 wound around cores 1506 and 1606. The cores 1506 and 1606 can be made out of a soft-magnetic material, or can be absent. If there is only one coil 1502 or 1602 wound around each sensor core 1506 or 1606, the position of the sensor target 1504 or 1604 is determined based on the change of the coil impedance with the target position in the direction of the Z-axis 1512 or 1612. In some sensors, there might be two coils 1502 or 1602 in each sensor head wound around a common soft-magnetic core. One of the coils—an exciter coil—is used to generate a magnetic flux in the magnetic circuit, whereas the other—a receiver coil—is used to measure a portion of the magnetic flux generated by the exciter coil which penetrates the receiver coil. In this case, the measurement of the position of the sensor target along the Z-axis 1512 or 1612 can be based on the measurement of the mutual inductance between the coils or the portion of the flux generated by one coil that penetrates the other coil. Using two sensor heads 1502a and 1502b located on the opposite faces of the sensor target 1504 with reference to the Z-axis 1512 in FIG. 15b, rather the single sensor head 1502 in FIG. 15a, allows achieving a more linear relationship between the sensor output and the sensor target displacement. Using two sensor heads 1605a and 1605b located on the opposite faces of the sensor target 1604 with reference to the X-axis 1648 in FIG. 16b rather the single sensor head in FIG. 16a, allows minimizing effects of the sensor target displacements in the X-direction on the sensor output.

SUMMARY

An apparatus for determining the position of a movable element relative to a stationary element along a measurement axis comprises a sensor head fixed in relation to the stationary element, the sensor head comprising a soft-magnetic core and a sensor target fixed in relation to the movable element, the soft-magnetic core and the sensor target separated by an air gap and defining a magnetic circuit. The apparatus also includes a conductive excitation coil coiled around the soft-magnetic core and adapted to produce an AC magnetic flux in the magnetic circuit, the AC magnetic flux corresponding with a total magnetic flux in the air gap, the sensor target comprising different electromagnetic properties at different locations along the measurement axis that causes a distribution of the total magnetic flux in the air gap to change when the sensor target is displaced along the measurement axis. In addition, the apparatus comprises a magnetic flux density sensor fixed in relation to the sensor head and residing in the air gap between the soft-magnetic core and the sensor target, the magnetic flux density sensor configured to detect magnetic flux density in a portion of the air gap. The apparatus also includes a controller in communication with the magnetic flux density sensor, configured to receive an output signal of the magnetic flux density sensor and determine the position of the sensor target along the measurement axis based on the total magnetic flux in the air gap and magnetic flux density detected by the magnetic flux density sensor.

A method for sensing a position of a movable element relative to a stationary element along a measurement axis comprises communicating a total magnetic flux in an air gap separating the stationary element from the movable element, the movable element comprising different electromagnetic properties along the measurement axis. The method includes measuring a magnetic flux density in a portion of the air gap. The method also includes determining the position of the movable element based on a ratio of the total magnetic flux in the air gap and the measured magnetic flux density.

An electric machine system comprises a first element, a second element configured to translate parallel to a measurement axis relative to the first element, a third element fixed in relation to the first element, the third element comprising a soft-magnetic pole, and a fourth element fixed in relation to the second element, the third element and the fourth element separated by an air gap, the third element and the fourth element defining a magnetic circuit. The system also includes a source element fixed in relation to the third element, the source element configured to produce an AC magnetic flux in the magnetic circuit, the AC magnetic flux corresponding to a total magnetic flux in the air gap. The system includes a sensor fixed in relation to the third element, adjacent the soft-magnetic pole, and residing between the third element and the fourth element. The sensor may be configured to measure magnetic flux density in a portion of the air gap. An electronics module in communication with the sensor may be configured to measure an output of the sensor and determine a position of the fourth element along the axis based on the output of the sensor and the total magnetic flux in the air gap.

The apparatus may further comprise a total magnetic flux sensor that is fixed in relation to the sensor head and configured to sense the total magnetic flux in the air gap between the soft-magnetic core and the sensor target. Further, the controller may be configured to determine the position of the sensor target along the measurement axis based on a ratio determined from the total magnetic flux in the air gap sensed by the total magnetic flux sensor and the magnetic flux density detected by the magnetic flux density sensor. The total magnetic flux sensor may be a conductive coil. The AC magnetic flux may be produced by an AC voltage of constant amplitude applied to the conductive excitation coil, the AC voltage of constant amplitude resulting in the total flux in the air gap being controlled to a known value. Further, the controller can be configured to determine the position of the sensor target along the measurement axis based on a ratio determined from the total magnetic flux in the air gap of known value and the magnetic flux density detected by the magnetic flux density sensor.

The magnetic flux density sensor can be a conductive coil. On the other hand, the magnetic flux density sensor can be a Hall Effect sensor. The sensor target may comprise a first portion and a second portion, where the first portion and the second portion comprise different electromagnetic properties along the measurement axis. The first portion of the sensor target can include a soft-magnetic, non-conductive material, and the second portion can include a conductive, non-magnetic material. The first portion of the sensor target can also include electrically isolated electrical steel laminations stacked in the measurement direction.

The soft-magnetic core may include a nonmagnetic, conductive coating, the nonmagnetic, conductive coating including a non-conductive interrupt preventing formation of a closed conductive loop within the coating around the magnetic circuit. The sensor target may be configured to rotate about the measurement axis.

The method for sensing a position of a movable element relative to a stationary element along a measurement axis may include measuring the total magnetic flux in the air gap, and the ratio is determined from the total magnetic flux measured in the air gap and the measured magnetic flux density. Communicating the total magnetic flux in the air gap may include energizing an excitation coil with an AC current. Communicating the total magnetic flux in the air gap may include applying an AC voltage of constant amplitude to the excitation coil, the AC voltage of constant amplitude resulting in the total flux in the air gap to be controlled to a known value. Determining the position of the movable element based on the ratio may comprise determining a baseline ratio determined from the measured magnetic flux density and the total magnetic flux for a known position of the movable object, and comparing the ratio to the baseline ratio.

The electric machine system may include a total magnetic flux sensor fixed in relation to the third element and configured to sense a total magnetic flux confined between the third element and the fourth element. The sensor may comprise a magnetic flux density sensor, and the electronics module may be configured to determine the position of the fourth element along the measurement axis based on a ratio determined from the output of the magnetic flux density sensor and total magnetic flux sensed in the air gap by the total magnetic flux sensor.

The source element may include a conductive coil wound around the third element, the conductive coil configured to produce the AC magnetic flux in the magnetic circuit based on an AC excitation current applied to the conductive coil. The AC excitation current in the conductive coil may be controlled to maintain a total magnetic flux in the air gap of substantially constant amplitude of known value. The electronics module may be configured to determine the position of the fourth element along the axis of motion based on a ratio determined from the output of the sensor and the known value of the total magnetic flux amplitude in the air gap. The first element may comprise a rotor and the second element may comprise a stator.

In the position sensor of the present disclosure, the information about the target position is contained not in the impedance of a coil and not in the mutual inductance between two coils wound on a common soft-magnetic core, but in the distribution of the field in the air gap between the poles of the sensor head and the sensor target. One of the advantages of this method is that properties of the air gap, and therefore distribution of a magnetic field in it, are not affected much by properties of the soft-magnetic core used to induce the field. Furthermore, a sensor can be designed so that target displacements in directions orthogonal to the measurement direction would have much less effect on the field distribution than a displacement in the measurement direction. At the same time, in contrast to air-core sensors, the excitation coil will be wound on a soft-magnetic core, and, therefore, will have a high impedance and may be driven by a high voltage at an optimal frequency (tens of kilohertz) with little risk of producing too much current and overheating.

DESCRIPTION OF DRAWINGS

FIGS. 1a-b are schematics illustrating an embodiment of the position sensor in accordance with the present disclosure.

FIG. 4 is a schematic illustrating the operating principle of one of the embodiments of the present invention where the flux density sensing coil and the total flux sensing coil may include multiple turns.

FIGS. 6a-b are schematics illustrating an embodiment of the position sensor without the total flux sensing coil.

FIGS. 11a-c are schematics illustrating an embodiment of the position sensor adapted to a rotating machine in accordance with the present disclosure.

FIG. 13 is a schematic illustrating an embodiment of the position sensor using a Hall Effect sensor.

DETAILED DESCRIPTION

Figure 2:
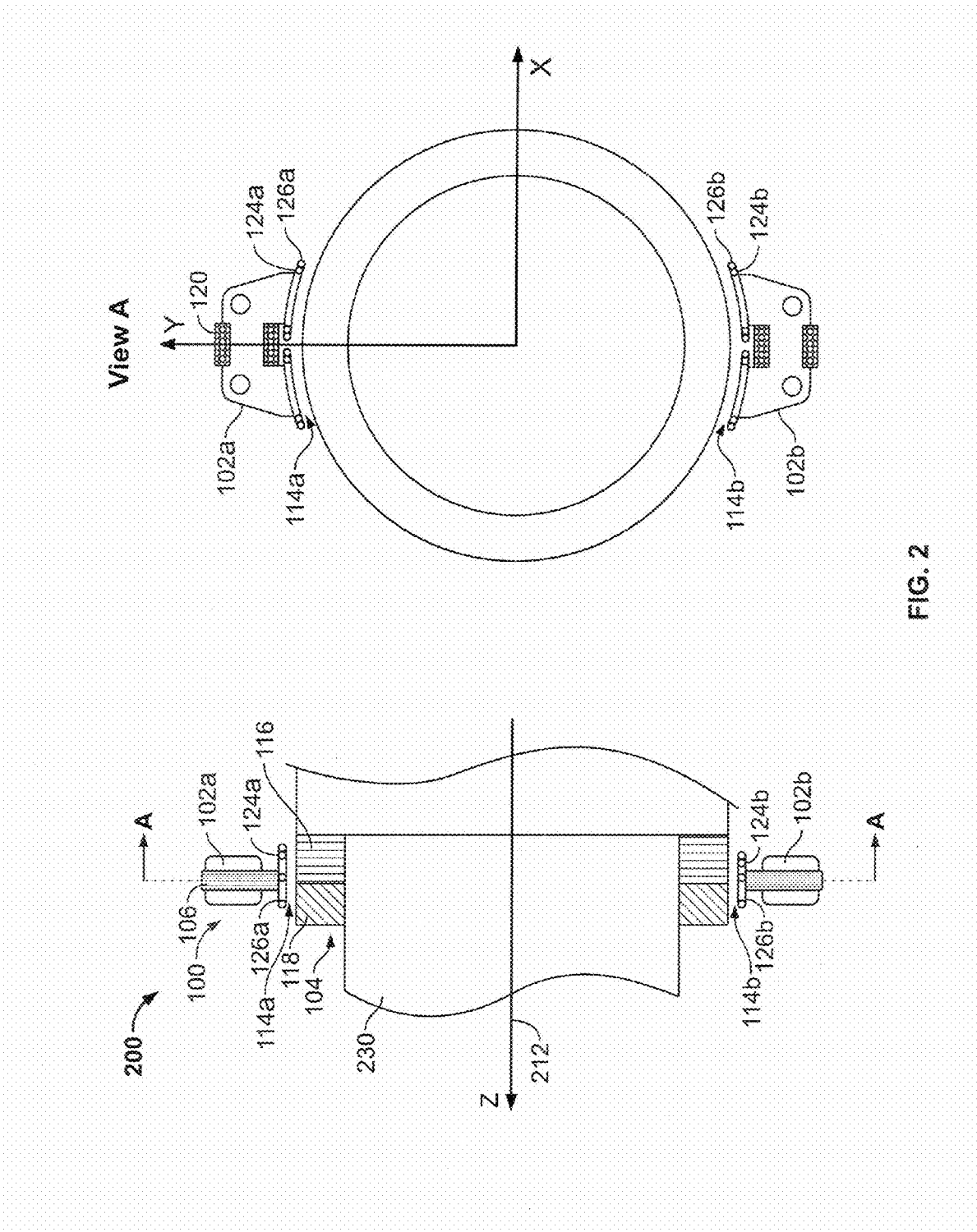
FIG. 2 is a schematic illustrating an embodiment of the position sensor adapted to a rotating machine in accordance with the present disclosure.

This disclosure relates to measuring positions of objects, and more particularly, noncontact measuring positions of objects through measurements of parameters characterizing distribution of an AC magnetic field in an air gap between stationary and moveable portions of the sensor magnetic circuit. Although described in more general terms above, more specific examples of implementations of a noncontact electromagnetic position sensor are presented below.

Inductive, reluctance and eddy-current position sensors may use soft-magnetic cores, which may introduce problems in some implementations due to their sensitivity to external magnetic fields, for example, in an active magnetic bearing system (AMB) where position sensors work in combination with control electronics and electromagnetic actuators to achieve noncontact support of an object.

In an example AMB, the position of a suspended object can be constantly monitored by a set of position sensors, which provide information to control electronics. Based on the input from the sensors, the control electronics detects if the object has deviated from the desired position and generates electrical currents in the electromagnetic actuators to produce forces necessary to bring the object back to the desired position in space.

Electromagnetic actuators can create strong magnetic fields in order to produce necessary forces, and limitations on the machine envelope typically require that the position sensors be located fairly close to the actuators. As a result, the magnetic field from the actuators can penetrate into the soft-magnetic cores of the sensors. Soft-magnetic materials that can be used for the sensor cores may have nonlinear magnetization (BH) curves. An additional magnetic field leaking from the actuators can change the material operating point on a BH curve, in turn affecting the impedance of the sensor coil. In a single-coil sensor, the object position estimate is based directly on the coil impedance; therefore, an external field can produce a position measurement error. In a two-coil sensor, change of the impedance of the exciter coil may result in a change of the magnetic flux this coil produces and, consequently, a change of the output voltage on the receiver coil.

The position sensor described in the present disclosure can determine target displacement based on information contained in the distribution of the magnetic field in the air gap between the poles of the sensor head and the sensor target, and not in the impedance of a coil or in the mutual inductance between two coils wound on a common soft-magnetic core. Furthermore, sensor target displacements in directions orthogonal to the measurement direction would have less of an effect on the field distribution than a displacement in the measurement direction. At the same time, the excitation coil can be wound on a soft-magnetic core, and, therefore, will have a high impedance and may be driven by a high voltage at an optimal frequency (e.g., tens of kilohertz) without risk of producing too much current and overheating.

For example, FIGS. 1a-b illustrate at least a portion of the position sensor 100 in accordance with the present disclosure. Sensor 100 is made up of a sensor head 102 and a sensor target 104. The sensor head 102 can include a soft-magnetic core 106 that defines soft-magnetic poles 108a and 108b. The soft-magnetic poles 108a and 108b are adjacent to and separated by an air gap 114 from the sensor target 104. Even though a U-shaped soft-magnetic core is shown, using cores of other shapes, such as E-shaped, is possible. The sensor head may be stationary relative to the sensor target. For example, the sensor head may be affixed to a stator of an electric machine and the sensor target affixed to a rotor of the electric machine. It should be understood, however, that the term "stationary" does not require that the sensor head be affixed or unmovable relative to the earth. For example, if the sensor head 102 is affixed to an electric machine that can and does move, the sensor head 102 may move with the electric machine. But the sensor head 102 could remain stationary relative to the sensor target 104, which can move independent of the sensor head 102.

The sensor target 104 is mounted to or otherwise affixed to the movable object, so that the sensor target 104 moves with the object. The object can be configured to translate in a direction parallel to the measurement axis Z 112 and, in some embodiments, can rotate about the measurement axis Z 112. Note that in addition to translation along the measurement axis Z, the object may also translate along the axes orthogonal to the Z axis; however, displacements along the Z axis will be measured. The sensor target 104 interfaces with the sensor head 102 through a target engagement surface 110. Because target engagement surface 110 may be parallel to the measurement direction Z 112 rather than orthogonal to it, the sensor target 104 can freely slide in the measurement direction Z 112 without interfering with the sensor head 102. This simplifies assembly and ensures large measurement range of the sensor 100.

Electromagnetic properties of the sensor target 104 can change in the measurement direction Z 112 in a non-uniform way so that the magnetic flux distribution in the air gap 114 would change whenever the sensor target 104 is displaced in the measurement direction Z 112. A measurement of the target displacement is based on the monitoring the magnetic flux distribution in the air gap 114. One way to achieve such a non-uniform change of the electromagnetic properties of the sensor target 104 is to split it in the measurement direction Z 112 into two portions with different electromagnetic properties: target portion A 116 is soft-magnetic and preferably nonconductive, and target portion B 118 is nonmagnetic and preferably conductive. Target portion A 116 can also be assembled of thin isolated laminations of electrical steel stacked in the measurement direction Z 112. Target portion B 118 can be made out of any nonmagnetic material including aluminum stainless steel, or air; however, better performance can be achieved if the target material is conductive such as aluminum or stainless steel. The interface between the materials of portion A 116 and portion B 118 can form a distinct boundary orthogonal to the measurement direction Z.

The soft-magnetic core 106, the soft-magnetic poles 108a and 108b, and the sensor target 104 form a magnetic circuit. An excitation coil 120 coiled around the soft-magnetic core 106 can induce an AC magnetic excitation flux 122 in this magnetic circuit when energized with an AC excitation current 128. A square-wave time profile for the AC current 128 can be used, but other time-profiles can also be used, such as sinusoidal or saw-tooth, etc. The soft-magnetic core 106 can guide the magnetic flux 122 to the air gap 114 between the sensor head 102 and the target 104 where it is the most sensitive to the target position. This results in a larger intrinsic sensitivity of the sensor 100.

The sensor 100 of FIGS. 1a-b also includes a flux density sensing coil 124 and a total flux sensing coil 126 inserted into the air gap 114 between the poles 108a and 108b of the sensor head 102 and the sensor target 104. The AC magnetic flux crossing the air gap 114 induces a voltage in coils 124 and 126 in accordance with Faraday's law. For simplicity, each of the coils 124 and 126 shown in FIG. 1b has only two turns, each encircling one of the sensor head poles 108a and 108b. The coils, however, are not restricted to having two turns, and the disclosure contemplates a higher number of turns.

FIG. 1b shows a mutual orientation of the projections of the sensor head poles 108a and 108b, the flux density sensing coil 124, and the total flux sensing coil 126. The figure shows the magnetic excitation field 122 directed into the page at the sensor head pole 108a, whereas the magnetic excitation field is directed out of the page at the sensor head pole 108b. The turns of each coil in FIG. 1b are shown interconnected in a configuration that takes into account the opposite directions of the magnetic fluxes in the two poles 108a and 108b. This configuration results in voltages induced in coils adding to each other rather than canceling each other. For example, if the coil associated with pole 108a were wound clock-wise, then the coil associated with pole 108b would be wound counter clock-wise (and vice versa). The position of the sensor target 104 is determined by the ratio of the voltages induced on the flux density sensing coil 124 and the total flux sensing coil 126 or vise versa. Because this ratio is defined by the distribution of the magnetic flux in the air gap in the Z direction 112, rather than the magnitude of this flux, it can be less affected by variations of the properties of the sensor head core 106 or target displacements in directions orthogonal to the measurement direction Z.

When the excitation winding 120 is energized with AC current 128, it will generate an AC magnetic flux 122 in the air gap 114, which, in turn will induce AC voltage in both the flux density sensing coil 124, $U_B$ and the total flux sensing coil 126, $U_F$. The voltages on the terminals of the flux density sensing coil 124 and the total flux sensing coil 126 will be read by electronics with high-impedance inputs. The ratio between the voltage on the terminals of the flux density sensing coil 124 and the total flux sensing coil 126 or vice versa will be calculated and converted into the signal representing the target displacement in the measurement direction Z 112. Because of the high impedance of the electronics inputs, there may be no currents in either the total flux sensing coil 126 or the flux density sensing coil 124 and, therefore, no voltage drop due to the coil resistance regardless of how small the cross-sections of the coil conductors are.

The flux density sensing coil 124 and the total flux sensing coil 126 can be made using printed circuit board (PCB) technology. A PCB coil may consist of several 0.003 inch-wide copper traces with 0.003 inch spaces between them. A four-layer PCB board with two layers dedicated to the flux density sensing coil 124 and two layers dedicated to total flux sensing coil 126 would have a thickness of approximately 0.015 inches. The thickness of a PCB coil allows for small air gaps between the sensor head poles and the sensor target engagement surface. This can result in a large inductance of the excitation coil, a low excitation current at reasonably low excitation frequencies, and sufficiently large voltages applied to the excitation coil even if this coil has a small number of turns. As the ratios between the number of turns in the sensing coils and in the excitation coil get higher, and as the voltages on the excitation coil get higher, the voltages on the sensing coils can get higher, which can increase the signal-to-noise ratios.

The soft-magnetic core 106 can facilitate operation of the sensor 100 within an optimum frequency range. While using higher voltages on the excitation winding 120 and/or a lower number of turns in this winding would allow achieving higher signal-to-noise ratios, the currents induced by these voltages may cause overheating and damage to the excitation winding 120. For a given voltage, the current can be made smaller by either increasing the coil impedance or increasing the voltage frequency, or both. Increasing the frequency can allow the sensor to respond faster to a target displacement. At very high frequencies, however, impedances of the wires connecting the sensor to electronics can affect the measurements, and designing the electronics becomes more difficult in general. Therefore, for a displacement sensor used in a typical dynamic mechanical system, there will be an optimum frequency range. If the frequency were below this range (e.g., below 15 kHz), the sensor response to target movement could be too slow; if the frequency were too high (e.g., above 100 kHz), the system design could be too complicated and too sensitive to properties of the connecting wires such as length, layout, or the presence of intermediate connectors. The soft magnetic core 106 allows sensor operation within the optimum frequency range because it can increase the impedance of the excitation coil. A high impedance excitation coil permits using high excitation voltages, which, in turn, can increase the signal-to-noise ratio.

PCB technology allows for the printed circuit boards to be made flexible. This allows them to be bent to follow the curvature of the sensor head poles and glued to the sensor head poles in systems where the sensor head poles may have a curvature, such as the one shown in FIG. 2.

The system 200 in FIG. 2 shows the position sensor 100 adapted for use in applications where the sensor target 104 is secured to or integrated with the shaft 230 spinning around the measurement axis Z 212. For example, system 200 includes sensor head 102a and complementary sensor head 102b. Flux density sensing coil 124a and total flux sensing coil 126a are positioned in the air gap 114a between sensor head 102a and sensor target 104. Complementary flux density sensor 124b and total flux sensor 126b are positioned in the air gap 114b between sensor head 102b and sensor target 104. Sensor target 104 can be constructed with target portion A 116 and target portion B 118. Sensor target portion A 116 can be composed of insulated steel lamination stacks arranged in the axial direction. This arrangement can reduce the effects of eddy currents in portion A 116, effectively making target portion A 116 nonconductive in the Z direction. Since each lamination is continuous around the rotation axis Z 212, target portion A 116 can withstand large centrifugal forces. Furthermore, integration of this sensor 100 in most machines, such as that shown in FIG. 2, can easily be facilitated since no engagement surface normal to the measurement direction is required, and the movable part of the assembly, including the sensor target 104 and rotor shaft 230, can be simply slid into the stationary part.

Figure 3A:
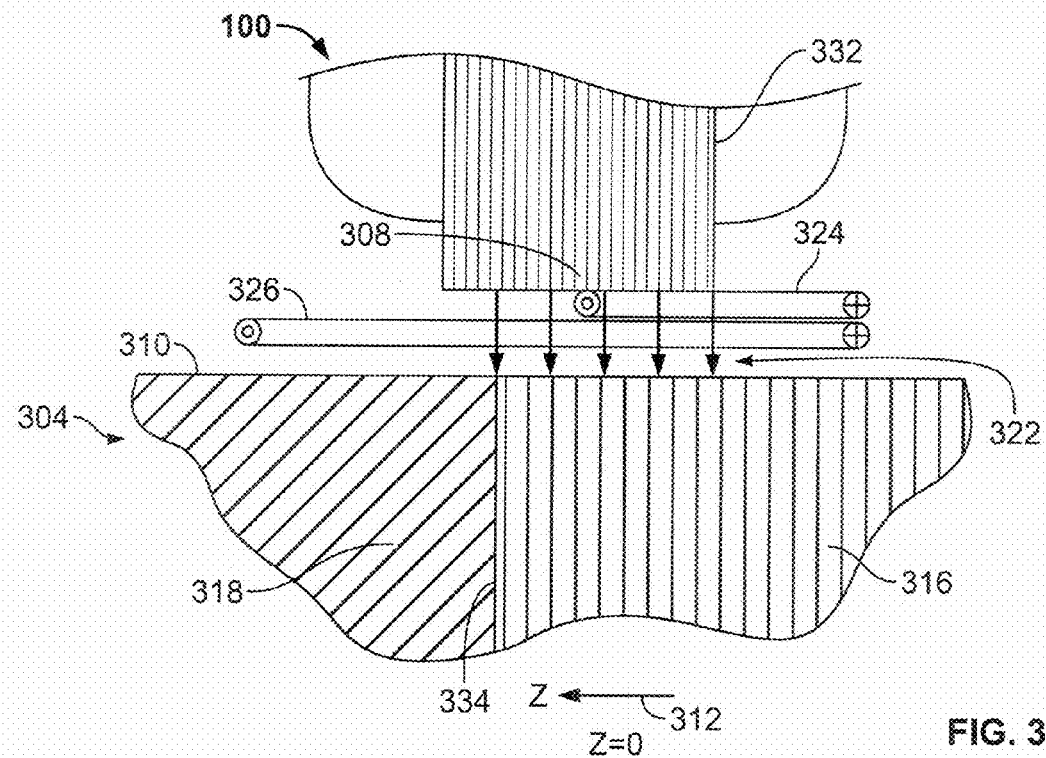
FIGS. 3a-c are schematics illustrating the operating principle of one of the embodiments of the present invention utilizing a flux density sensing coil and a total flux sensing coil.
Figure 3B:
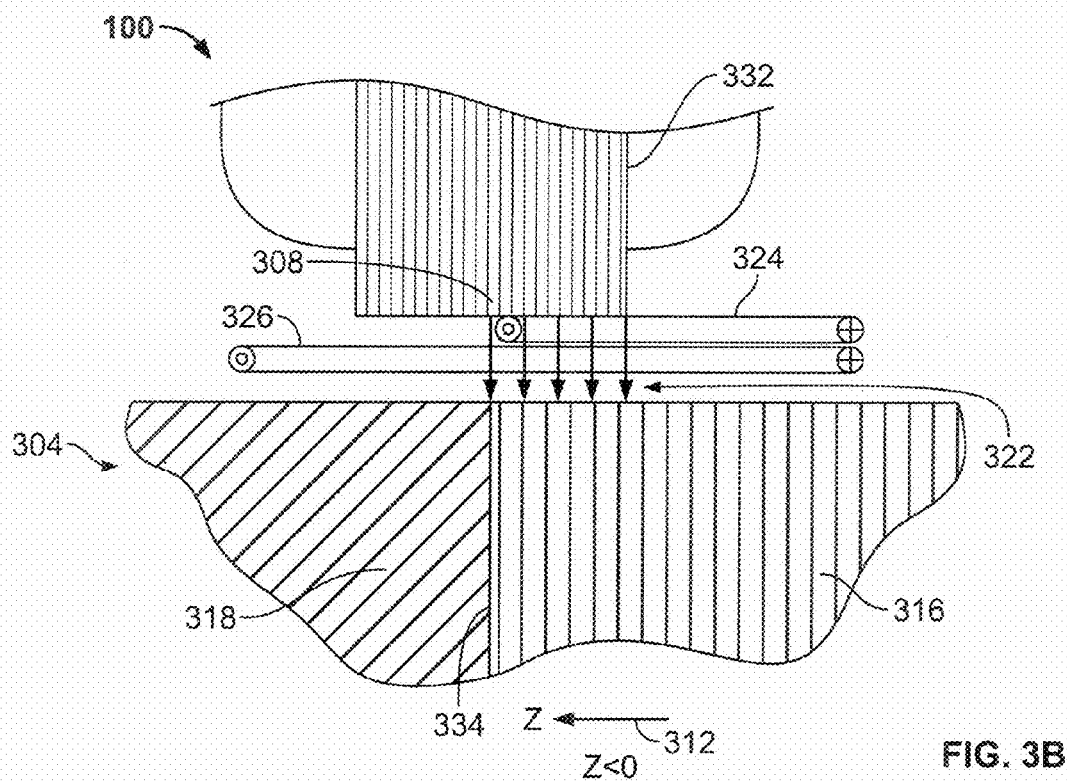
Figure 3C:
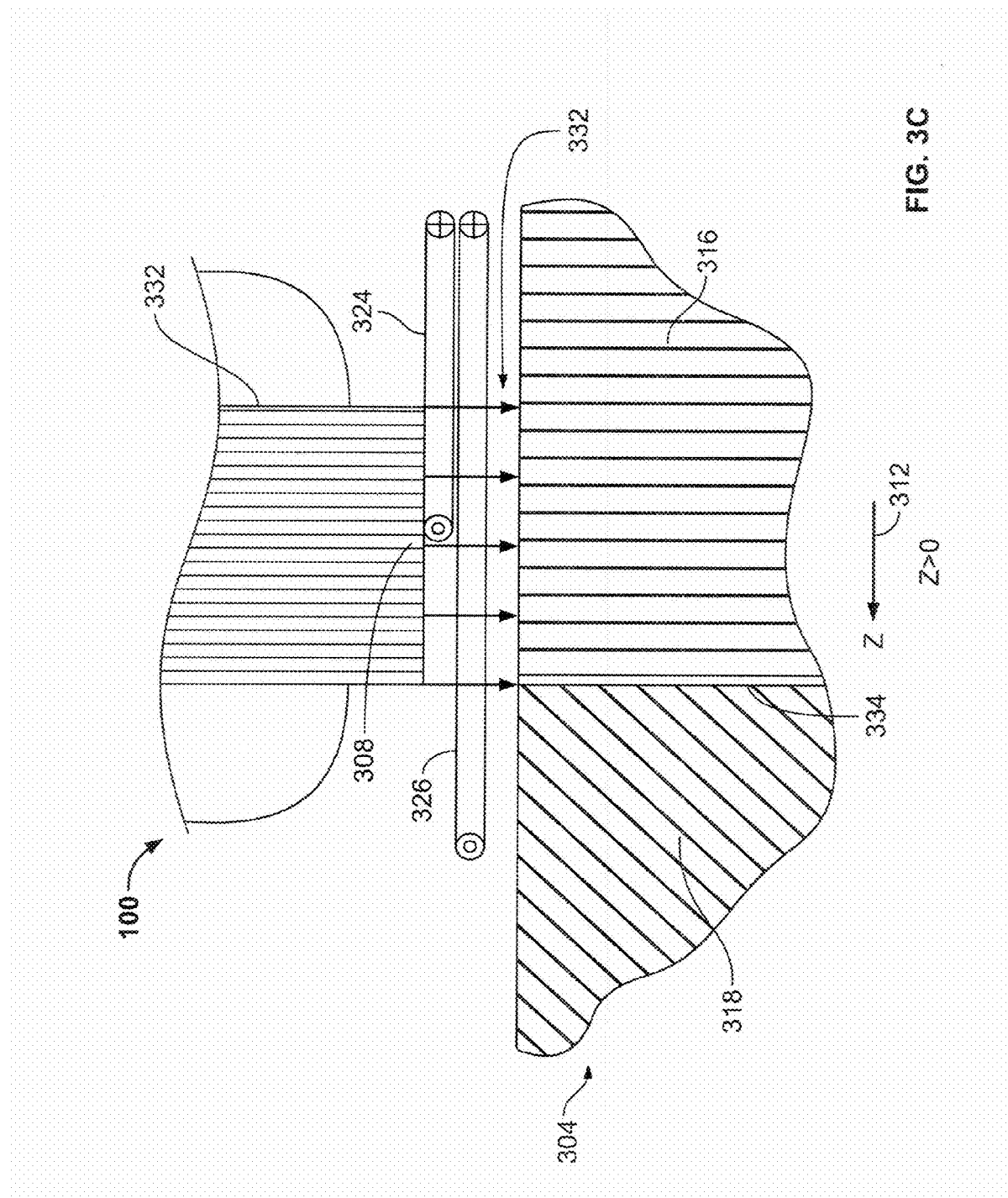

FIGS. 3a-c show a close-up sectional view of sensor 100 showing the air gap between one of the sensor head poles 308 and the sensor target 304 incorporating the flux density sensing coil 324 and the total flux sensing coil 326. The circles represent cross-sections of individual conductor turns. Dots and crosses inside the circles indicate the direction of winding: into the page for the cross-sections marked with crosses and out of the page for the cross-sections marked with dots. Arrows going from the sensor head pole 308 to the target engagement surface 310 represent excitation magnetic field 322, and the number of these lines represent the flux. Because the excitation AC magnetic field 322 is attracted to the sensor target portion A 316 (made of nonconductive or laminated soft-magnetic material) and expelled from the sensor target portion B 318 (made of nonmagnetic and preferably highly conductive material), it is restricted to the area between the sensor target active edge 332 and the sensor head active edge 334.

For simplicity, the total flux emanating from the pole 308 is shown to stay the same (e.g., 5 lines of flux). As shown in FIG. 3a, when the sensor target 304 is in its nominal position (Z=0), the number of flux lines linked to the total flux sensing coil 326 is equal to 5, and the number of flux lines linked to the flux density sensing coil 324 is 3. If the sensor target 304 moves in the negative Z 312 direction (Z<0) as shown in FIG. 3b, the number of flux lines linked to the flux density sensing coil 324 increases to 4. Oppositely, if the sensor target 304 moves in the positive Z 312 direction (Z>0) as shown in FIG.

3c, the number of flux lines linked to the flux density sensing coil 324 reduces to 2. The number of the flux lines linked to the total flux sensing coil 326, however, always remains 5. The AC fluxes linked to the coils will induce AC voltages on the coil terminals proportional to these fluxes. Therefore, the ratio of the voltage induced on the terminals of the flux density sensing coil 324 to the voltage induced on the terminals of the total flux sensing coil 326 or vise-versa can be used as a measure of the displacement of the sensor target 304 in the Z312 direction. This can be achieved, for example, by comparing an initial or baseline ratio associated with an initial position to subsequent ratios. Even though for simplicity it was assumed in FIGS. 3a-c that the total flux from the sensor head poles remained constant (i.e., 5 flux lines), this is not necessary since the fluxes linked to two coils would vary at the same rate and the ratio between them would remain constant.

FIG. 4 expands the idea illustrated in FIG. 3 to a larger number of turns in the total flux sensing coil 426 and the flux density sensing coil 424. Each turn in the total flux sensing coil 426 always surrounds the same number of flux lines (i.e., 5); therefore, the total flux linked to this coil always remains constant. To the contrary, all the turns in the flux density sensing coil 424 located between the sensor target active edge 434 and the sensor head active edge 432 will experience an increase in the linked flux when the sensor target 404 moves in the negative Z412 direction and a decrease when the sensor target 404 moves in the positive Z412 direction.

Figure 5:
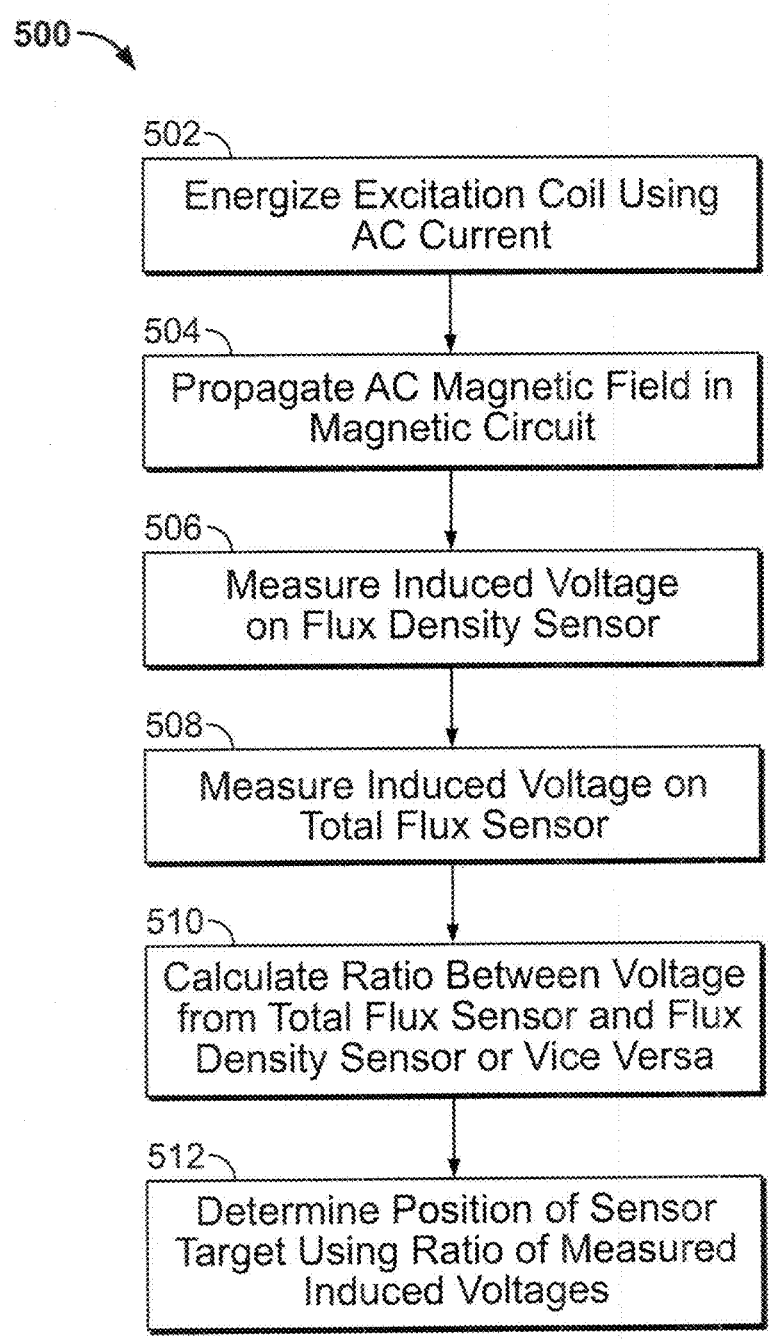
FIG. 5 is a flowchart illustrating the process for determining the position of a sensor target using the position sensor according to the present disclosure utilizing a flux density sensing coil and a total flux sensing coil.

FIG. 5 is a flowchart 500 describing how the position sensor of the present disclosure can determine the position of a sensor target. The excitation coil is energized using an AC current (block 502). The time profile of the AC current can be a square-wave, sinusoidal, saw-tooth, or any other periodic signal. The AC current generates an AC magnetic field in the magnetic circuit defined by the sensor core and the sensor target (block 504). The magnetic field establishes magnetic flux in the air gaps separating the sensor head from the sensor target. The magnetic flux induces a voltage in the flux density sensing coil and the total flux sensing coil. The voltage induced on the flux density sensing coil is measured (block 506). The voltage is proportional to the magnetic flux density in a strategically selected portion of the air gap where the flux density depends on the sensor target position in the measurement direction. The voltage induced on the total flux sensor is measured (block 508). This voltage is proportional to the total magnetic flux injected into the air gap. The ratio of the voltage measured on the flux density sensing coil and the total flux sensing coil is calculated (block 510). Because both voltages induced on the flux density sensing coil and the total flux sensing coil vary at the same rate when the total magnetic flux injected in the air gap varies due to various factors, such as changes in the properties of the soft-magnetic core, the ratio between them can be unaffected by such factors. The position of the target is determined from the calculated ratio of the measured voltages (block 512). It should be understood that the ratio may be calculated using values indicative of the magnitudes of the measured and/or predetermined voltages.

FIGS. 6a-b illustrate schematics of an embodiment of the position sensor 600 shown with the flux density sensing coil 624 but without the total flux density sensing coil. Sensor 600 is made up of a sensor head 602 and a sensor target 604. The sensor head 602 can include a soft-magnetic core 606 that defines soft-magnetic poles 608a and 608b. The soft-magnetic poles 608a and 608b are adjacent to and separated by an air gap 614 from the sensor target 604. The soft-magnetic core 606, the soft-magnetic poles 608a and 608b, and the sensor target 604, form a magnetic circuit. Sensor target 604 is configured to translate along the Z axis 612, and is made up of sensor target portion A 616 and portion B 618. Target portion A 616 is soft-magnetic and preferably nonconductive, and target portion B 618 is nonmagnetic and preferably conductive. An excitation coil 620 coiled around the sensor core 606 can induce an AC magnetic excitation flux 622 in the magnetic circuit when energized by an excitation current 628. The soft-magnetic core 606 can guide the magnetic flux 622 generated by the coil 620 to the air gap 614 between the sensor head 602 and the target 604 target engagement surface 610 where it is the most sensitive to the target position. This results in a larger intrinsic sensitivity of the sensor 600.

In the configuration shown in FIGS. 6a-b, the sensor can use fewer connecting wires between the sensor head and the electronics than in the embodiment utilizing both the total flux sensing coil and the flux density sensing coil. The AC current 628 can be produced by applying an AC voltage 640 of a constant amplitude to the terminals of the excitation coil 620. The effect of this method of inducing the current 628 is that if the excitation flux leakage within the sensor head 602 is negligible, the amplitude of the total flux injected into in the air gap 614 would be constant regardless of the magnetic reluctances of the soft-magnetic core 606, sensor target 604, and the air gap 614. Since the excitation flux can be kept constant, sensor target position can be determined using the induced voltage $U_B$ 642 on the flux density sensing coil 624.

Figure 7A:
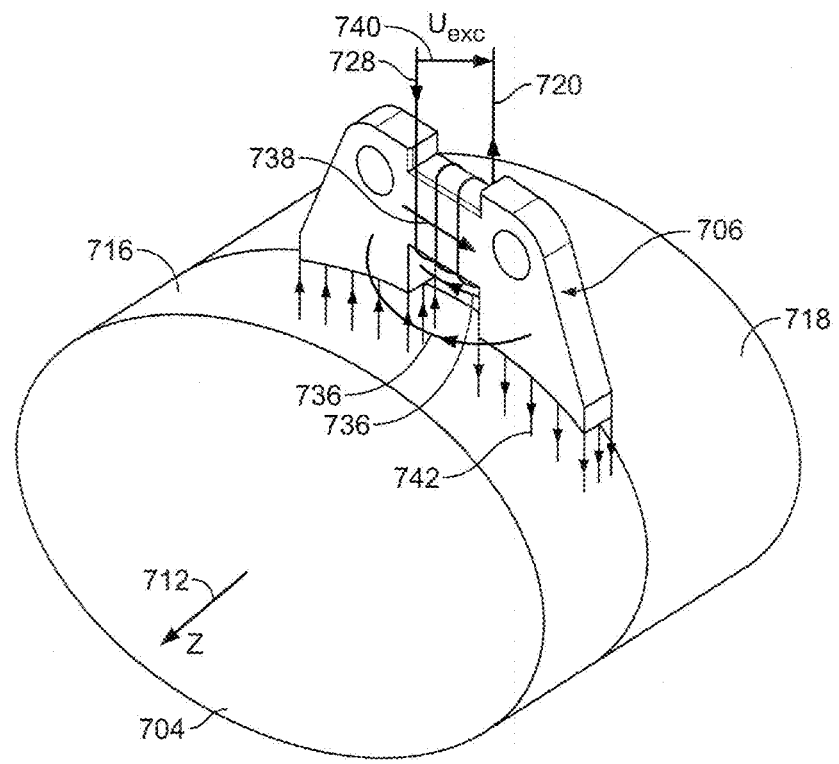
FIGS. 7a-b are schematics of an embodiment of the sensor head illustrating leakage field lines and an electrical circuit equivalent to a magnetic circuit of the sensor head taking into the account the leakage field.
Figure 7B:
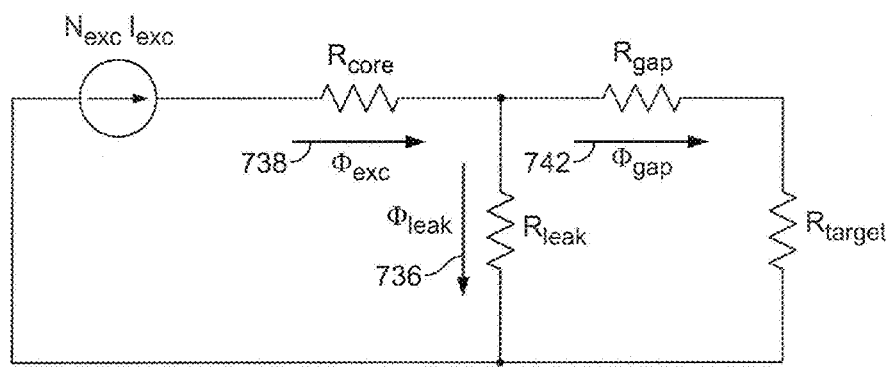

FIG. 7a illustrates examples of the leakage field, which is the field that emanates from the surface of the sensor head but never enters the sensor target. FIG. 7b illustrates by means of a simplified electrical circuit equivalent to the magnetic circuit of the sensor why the excitation magnetic flux injected into the air gaps stays constant in amplitude when the excitation current 728 is induced by applying a constant-amplitude voltage 740 and the leakage fields 736 are negligible. The designations in FIG. 7b are as follows:

$N_{exc}$—number of turns in the excitation coil;
$I_{exc}$—electrical current in the excitation coil;
$N_{exc}I_{exc}$—magnetomotive force produced by the excitation coil;
$R_{core}$—magnetic reluctance of the soft-magnetic core;
$R_{gap}$—net magnetic reluctance of two air gaps between the poles of the sensor head and the sensor target;
$R_{target}$—magnetic reluctance of the sensor target;
$R_{leak}$—net magnetic reluctance of all leakage paths associated with the sensor head;
$\Phi_{exc}$—net excitation flux;
$\Phi_{gap}$—magnetic flux injected into the air gaps;
$\Phi_{leak}$—net leakage magnetic flux bypassing the air gaps.
The variables $I_{exc}$ 728, $\Phi_{exc}$ 738, $\Phi_{gap}$ 742, and $\Phi_{leak}$ 736 are periodic functions of time.

An excitation voltage $U_{exc}(t)$ 740 produces an AC current 728. A resulting AC excitation field $\Phi_{exc}(t)$ 738 propagates through the soft-magnetic core 706 as shown and divides into two parts, leakage field 736 which closes its path without entering the sensor target 704, and the field 742 which enters the soft-magnetic portion 716 of the target 704. The target 704 can be split into a target portion A 716 and a target portion B 718. Target portion A 716 is soft-magnetic and preferably nonconductive. Target portion B 718 is nonmagnetic and preferably conductive. Target portion A 716 can also be assembled of thin isolated laminations of electrical steel stacked in the measurement direction Z 712. Target portion B 718 can be made out of any nonmagnetic material including aluminum stainless steel, or air; however, a better performance can be achieved if the target material is conductive such as aluminum or stainless steel. The interface between the materials of portion A 716 and portion B 718 can form a distinct boundary orthogonal to the measurement direction Z 712.

According to Faraday's Law, the voltage $U_{exc}(t)$ 740 on the terminals of the excitation coil 720 is related to the total flux through this coil $\Phi_{exc}(t)$ 738 as $$U_{exc}(t) = N_{exc} \frac{d\Phi_{exc}(t)}{dt}, \quad (1)$$

where $N_{exc}$ is the number of turns in the excitation coil 720. Equation (1) can be rewritten as $$\frac{d\Phi_{exc}(t)}{dt} = \frac{1}{N_{exc}} U_{exc}(t). \quad (2)$$

If $U_{exc}(t)$ 740 is a periodic signal with a constant amplitude, then $$\frac{d\Phi_{exc}(t)}{dt}$$

and, consequently, $\Phi_{exc}(t)$ 738 will be periodic signals with constant amplitudes. The magnetic flux injected into the air gap $\Phi_{gap}(t)$ 742 will be also constant if the magnetic leakage field 736 within the stationary part of the magnetic circuit is negligible.

By fixing the amplitude of the voltage applied to the terminals of the excitation coil in accordance with Equation (2) the amplitude of $\Phi_{exc}$ 738 is fixed and remains constant regardless of the values $R_{core}$, $R_{gap}$, $R_{target}$, and $R_{leak}$. If $R_{leak}$ is infinite (i.e., no leakage), the amplitude of $\Phi_{gap}$ 742 will be constant as well and there will be no need in the total flux sensing coil to measure it. Current $I_{exc}$ 728 in the excitation coil 720 may not stay constant, and any change to $R_{core}$, $R_{gap}$, $R_{target}$, and $R_{leak}$ can cause a change of current 728 necessary to maintain constant $\Phi_{exc}$ 738.

Figure 8:
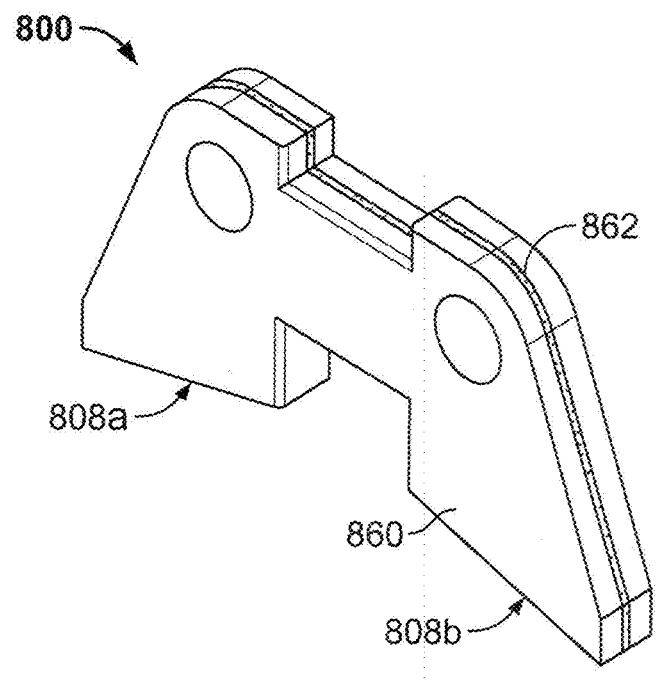
FIG. 8 is a schematic of an embodiment of the sensor head of the position sensor showing the sensor head with a conductive coating and a nonconductive interrupt.
Figure 9:
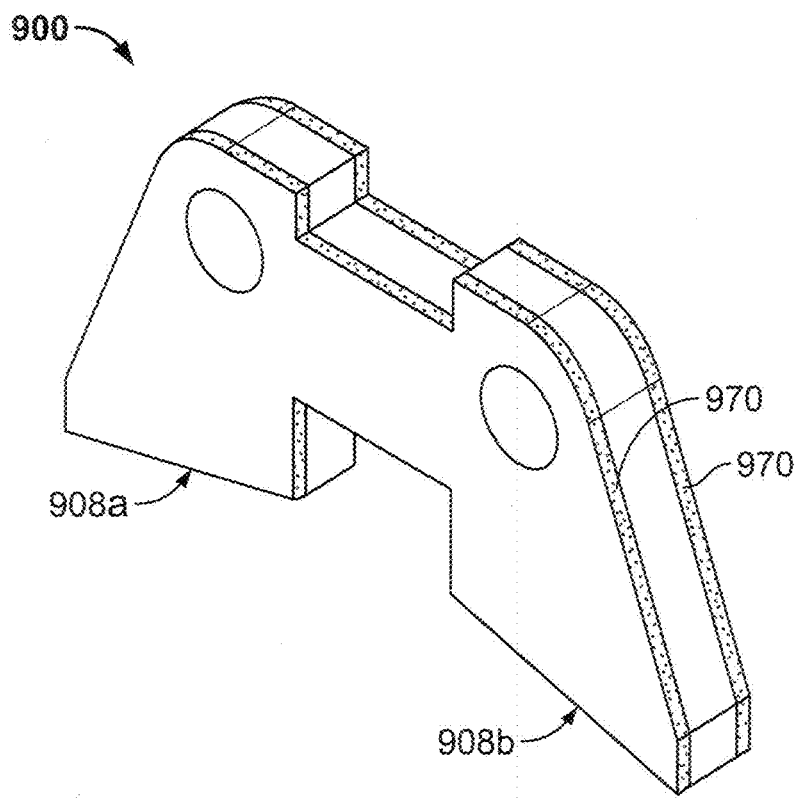
FIG. 9 is a schematic of an embodiment of the sensor head of the position sensor showing the sensor head with conductive face plates.

FIGS. 8-9 illustrate possible ways of reducing the leakage field 736. In the shielded core 800 shown in FIG. 8, the surfaces of soft-magnetic core 806, except for the poles 808a,b can be covered with a highly conductive but nonmagnetic material 860, such as copper. In order to prevent large eddy currents in the conductive coating surrounding the excitation magnetic flux in the soft-magnetic core, a nonconductive gap 862 can be introduced into a coating. Due to the so-called skin effect, conductive materials expel AC magnetic fields from their interior: the higher frequency of the field, the thinner the layer within the conductive material where this field can penetrate. Therefore, if a thickness of conductive shield is chosen appropriately for a given frequency, most of the magnetic field originated on one side of the shield will not be able to get to the other side. Thus, the field induced in the soft magnetic core of a sensor by the excitation current will not be able to cross an outer conductive coating and will be forced to move towards the poles 808a,b.

Depending on the targeted sensor performance, only some of the surfaces may be coated. For example, FIG. 9 shows an embodiment of the shielded core 900 where only two faces of the sensor core 906 are covered with conductive face plates 970. Sensor head poles 908a-b are uncovered. In implementations, the core 906 can be inserted into an envelope precut in a conductive housing and tailored to the outer perimeter of the sensor core 906. In such implementations, all surfaces of the core 906 will be covered with a conductive media. In order to implement a nonconductive gap, however, at least one of the conductive plates 970 shown in FIG. 9 would be kept isolated from the conductive housing.

Figure 10:
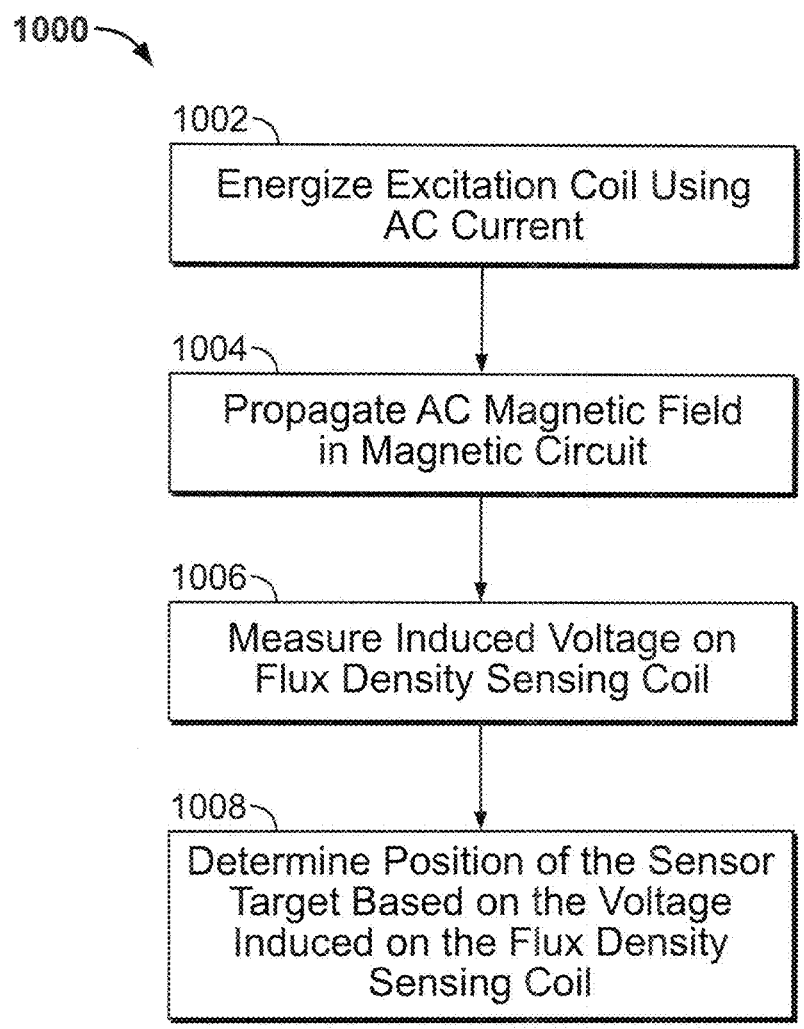
FIG. 10 is a flowchart illustrating the process for determining the position of a sensor target using the position sensor according to the present disclosure utilizing only a flux density sensing coil.

FIG. 10 is a flowchart 1000 describing how the position sensor of the present disclosure with only the flux density sensing coil (i.e., no total flux sensing coil) can determine the position of a sensor target. The excitation coil is energized with an AC current (block 1002) induced by an AC voltage of constant amplitude. The time profile of the AC voltage can be a square-wave, sinusoidal, saw-tooth, or any other periodic signal. The AC current generates an AC magnetic field in the magnetic circuit defined by the sensor core and the sensor target (block 1004). The magnetic field establishes magnetic flux in the air gaps separating the sensor head from the sensor target. The magnetic flux induces a voltage in the flux density sensing coil. The voltage induced on the flux density sensing coil is measured (block 1006). This voltage is proportional to the magnetic flux density in a strategically chosen portion of the air gap, where the magnetic flux density strongly depends on the sensor target position in the measurement direction. The position of the target is determined based on the voltage induced on the flux density sensing coil (block 1008). It should be understood that the ratio may be calculated using values indicative of the magnitudes of the measured and/or predetermined voltages.

Figure 11C:
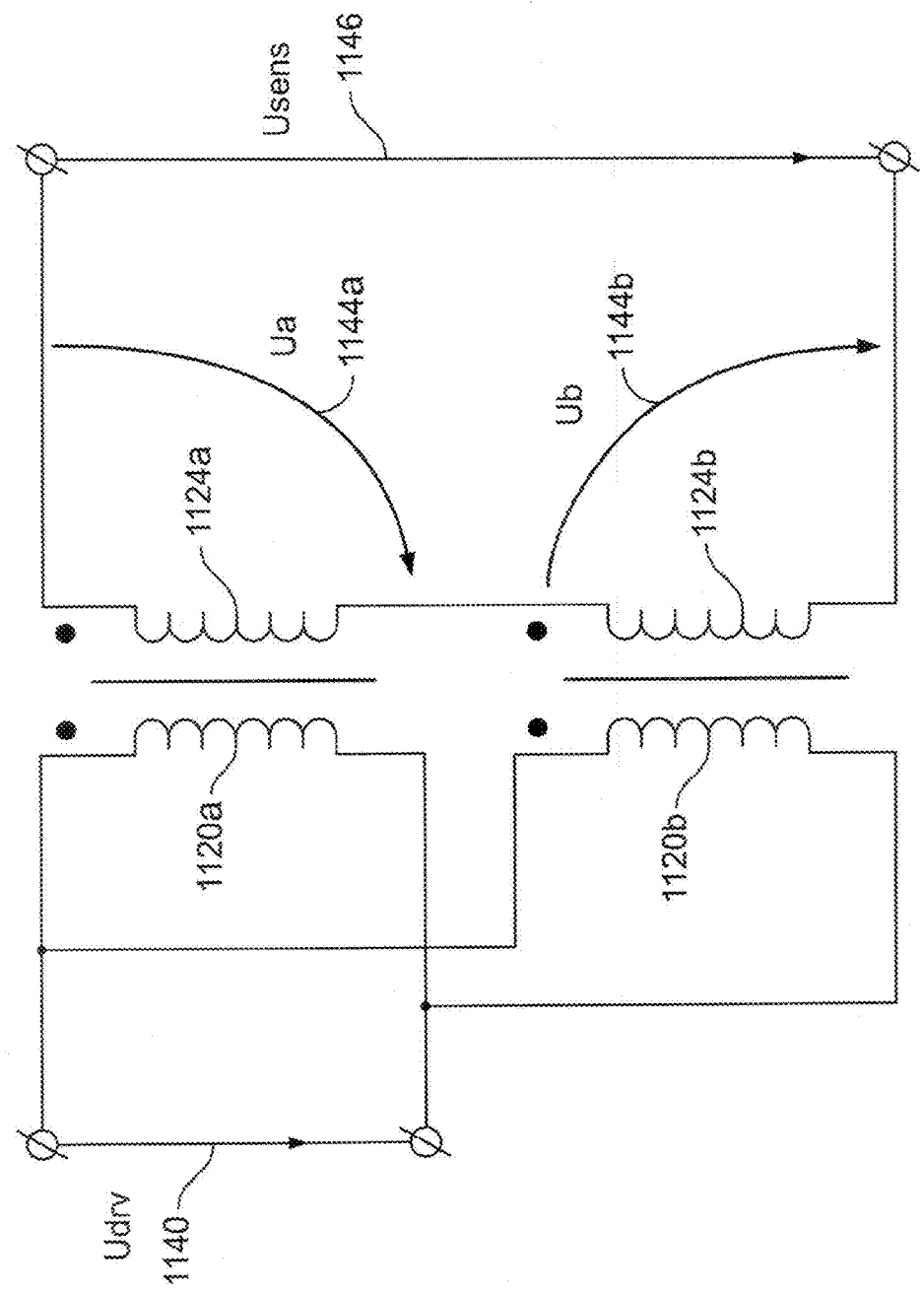

If two sensors with only flux density sensing coils per FIG. 6 are utilized in a differential arrangement such as system 1100 shown in FIGS. 11a-b, the need for reducing the leakage can be relaxed for applications where the effects of the external leakage fields are not too strong, but the effects of the sensor target displacements in directions orthogonal to the measurement direction Z 1112 need to be canceled. In this case, the excitation coils 1120a and 1120b of both sensor heads 1102a and 1102b can be connected in parallel to the same source of a constant AC voltage 1140, as shown in FIG. 11c, and two flux density sensing coils 1124a and 1124b should be connected in series so that the voltages 1144a and 1144b induced in these windings add up, rather than cancelling each other. The displacement of the sensor target 1104 in the Z direction 1112 can be calculated based on the sum of the voltages on two flux density sensing coils: $U_{sense}(\mathbf{1146}) = U_a(\mathbf{1144a}) + U_b(\mathbf{1144b})$.

The reasons that displacements of the target 1104 in directions X 1148 and Y 1150 orthogonal to the measurement direction Z 1112 do not affect the output voltage $U_{sense}$ 1146 are as follows. Displacements in the X direction 1148 have little effect on the output voltage of any sensor head 1144a or 1144b if the radius of the sensor target engagement surface 1111 is much larger than the dimension of the sensor heads 1102a and 1102b in this direction because the reluctance of the air gaps 1114a and 1114b do not change much during such displacements.

During a target displacement in the Y direction 1150, the reluctances of the air gaps 1114a,b in two sensor heads 1102a,b change linearly or nearly linearly with the displacement, but in opposite directions. For example, when the rotor shaft 1130, together with the sensor target 1104, shifts in the positive Y direction, the reluctances of the air gap 1114a associated with the top sensor head 1102a decrease, but the reluctances of the air gap 1114b associated with the bottom sensor head 1102b increase by the same amount. As a result, the magnetic flux in the air gap 1114a and, consequently the voltage on the flux density sensing coil 1124a will increase, whereas the magnetic flux in the air gap 1114b and, consequently the voltage on the flux density sensing coil 1124b will decrease by the same amount. Thus, the sum of the voltages on the terminals of the flux density sensing coils $U_{sense}$ 1146 will remain constant.

Similar to the arrangement shown in FIG. 2, the arrangement shown in FIG. 11 is convenient to use in applications where the shaft 1130 can spin around the measurement axis Z 1112. In this case, sensor target portion A 1116 can be composed of insulated steel lamination stacks arranged in the axial direction to reduce the effects of eddy currents in portion A 1116, effectively making target portion A 1116 nonconductive in the Z direction. Since each lamination is continuous around the rotation axis Z 1112, target portion A 1116 can withstand large centrifugal forces. Furthermore, integration of this sensor 1100 in most machines, such as that shown in FIG. 11, can easily be facilitated since no engagement surface normal to the measurement direction is required, and the movable part of the assembly, including the sensor target 1104 and rotor shaft 1130, can be simply slid into the stationary part.

Figure 12A:
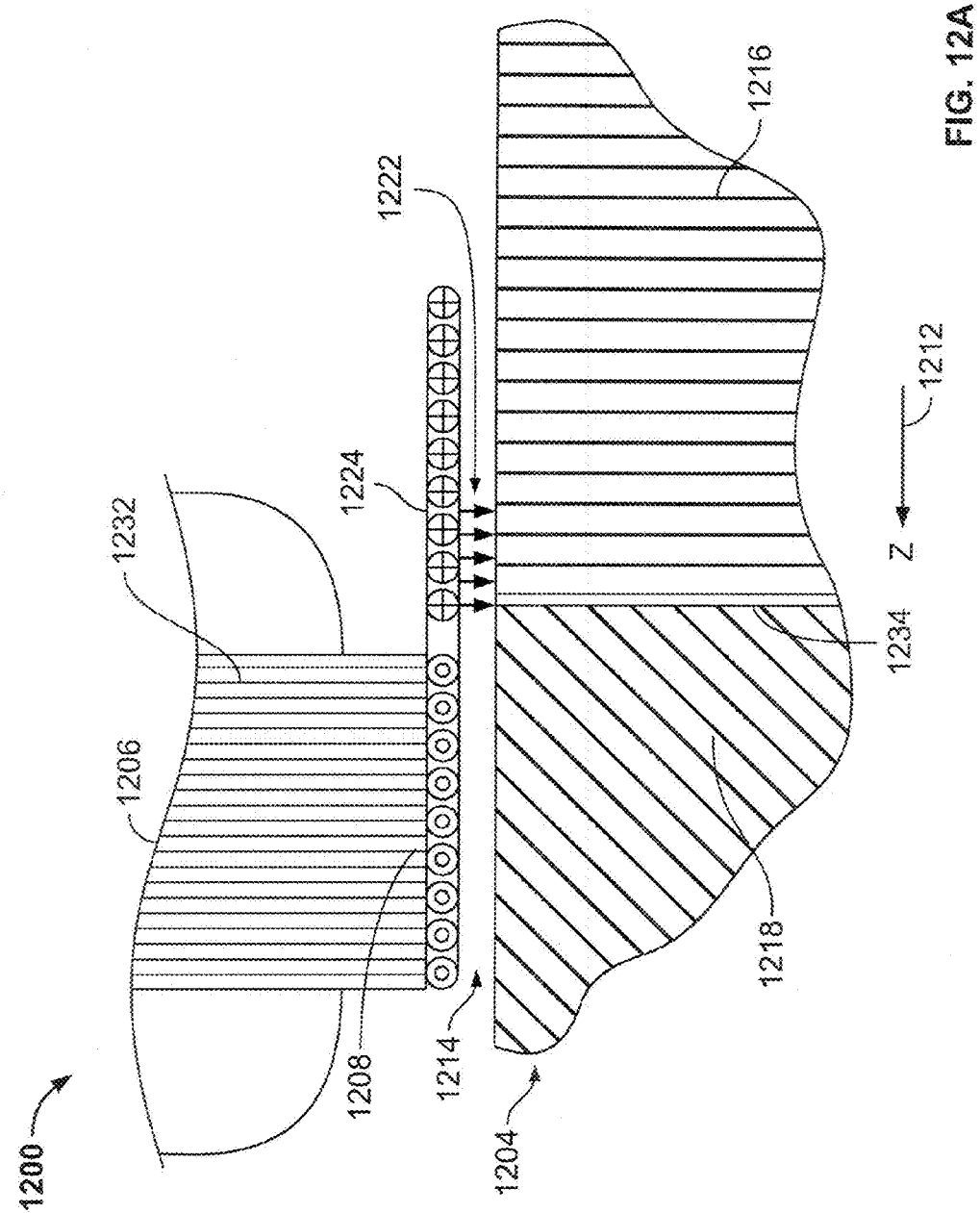
FIGS. 12a-b are schematics illustrating embodiments of the position sensors with the flux sensing coils in an alternative orientation.
Figure 12B:
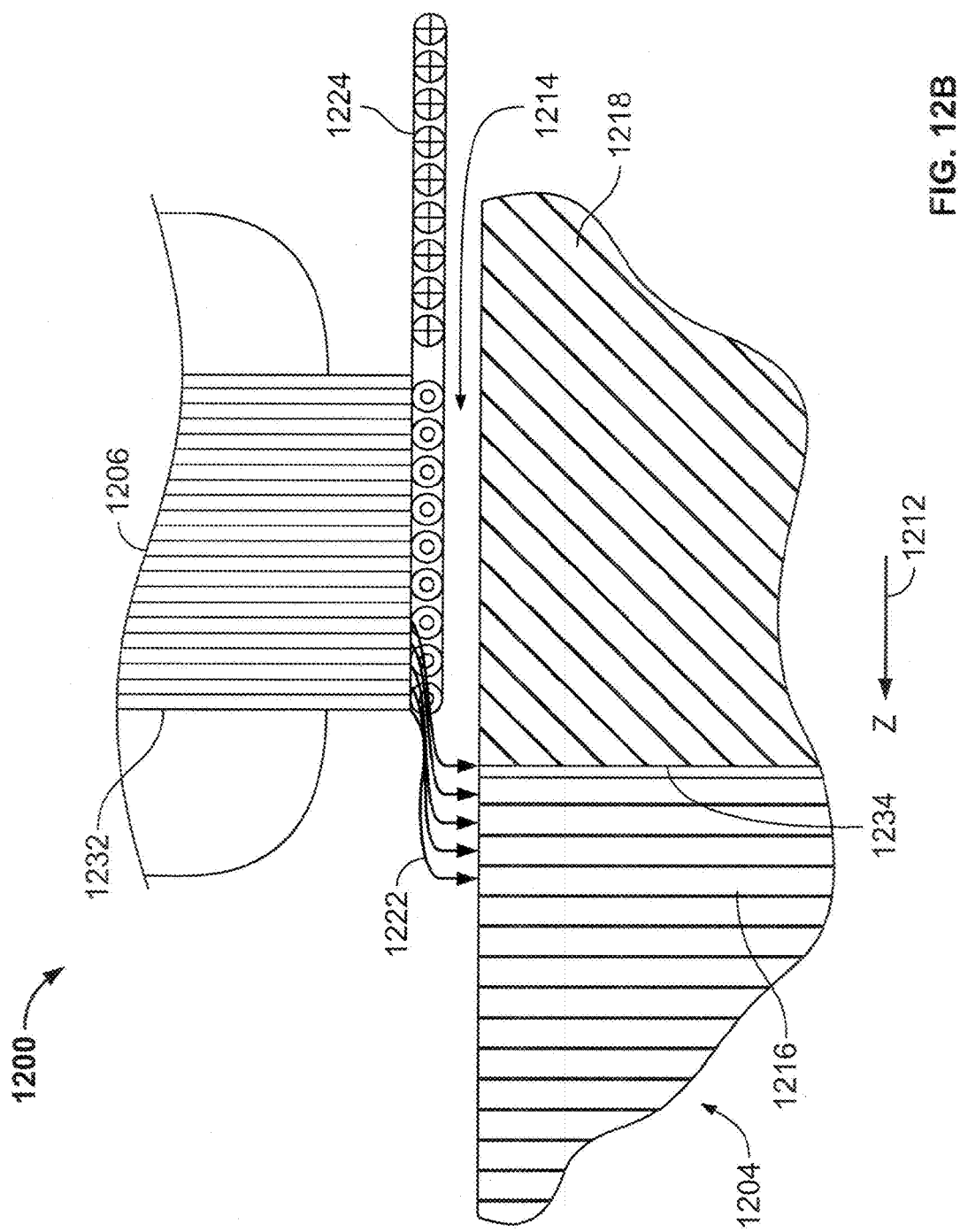

FIGS. 12a and 12b show embodiments of the position sensor 1200 where the sensor head poles 1208 face the non-magnetic and preferably conductive portion B 1218 of the sensor target 1204 rather than the soft-magnetic and preferably non-conductive portion A 1216. Sensor poles 1208 are separated from target 1204 by an air gap 1214. In contrast to FIGS. 1-4, 6 and 11 and in FIGS. 12a and 12b, the magnetic flux 1222 is no longer confined to a region defined by the edge 1232 of the sensor head core 1206 and the target interface boundary 1234, because the two no longer overlap. Instead, the magnetic flux is limited to a fringing flux propagating from a small region of the sensor head core 1206 adjacent to the edge 1232 and a small region of the soft-magnetic, and preferably non-conductive, sensor target portion A 1216 adjacent to the target interface boundary 1234. Since the total flux can be maintained almost the same as FIGS. 1-4, 6 and 11, but now is compressed in a much smaller area, the flux density will be much larger and will change much faster with the target displacement in the measurement Z-direction 1212, resulting in a higher sensitivity of the flux density sensing coil 1224. Another advantage of this configuration is that due to a larger reluctance of the air gap 1214, the sensor 1200 is inherently less sensitive to external leakage magnetic fields. In the arrangement shown in FIG. 12a the flux 1222 linked to the flux density sensing coil 1224, and consequently, the amplitude of the voltage induced on its terminals will increase when the sensor target 1204 moves in the positive Z1212 direction. Conversely, in FIG. 12b, the flux 1222 linked to the flux density sensing coil 1224, and consequently, the amplitude of the voltage induced on its terminals will decrease when the sensor target 1204 moves in the positive Z1212 direction.

In principle, in all embodiments the flux density sensing coil can be replaced by a device that measures flux density, for example, a Hall Effect sensor 1325 as shown in FIG. 13. FIG. 13 is a schematic of an embodiment of sensor 1300 implemented with a Hall Effect sensor 1325, instead of the flux density sensing coil. Sensor pole 1308 is separated from target 1304 by an air gap 1314. Target 1304 can be split in the measurement direction Z 1312 into two portions with different electromagnetic properties: target portion A 1316 is soft-magnetic and preferably non-conductive, and target portion B 1318 is non-magnetic and preferably conductive. Since the Hall Effect sensor 1325 will measure all magnetic fields, not only the excitation field, electronics would only have to react to a component of the sensor output which frequency matches the frequency of the excitation voltage and the phase is shifted by 90 degrees. Matching of the phase and frequency can also be used when a flux density sensor coil is used, which would also react to additional magnetic fields if their frequencies are nonzero. One difference being that there may not be a phase shift between the excitation voltage and the output of the flux density sensor coil. Compared to using a Hall effect sensor 1325, using a flux density sensor coils (e.g., 624) can facilitate ease of integration and ensures a lower sensitivity to low-frequency additional magnetic fields. In addition, localized defects on the target engagement surface would have a very limited effect on the output of a the flux density sensing coil (e.g., 624) because it measures a magnetic flux density averaged over a large area as in contrast to the Hall effect sensor 1325 measuring a localized magnetic flux density.

Figure 14:
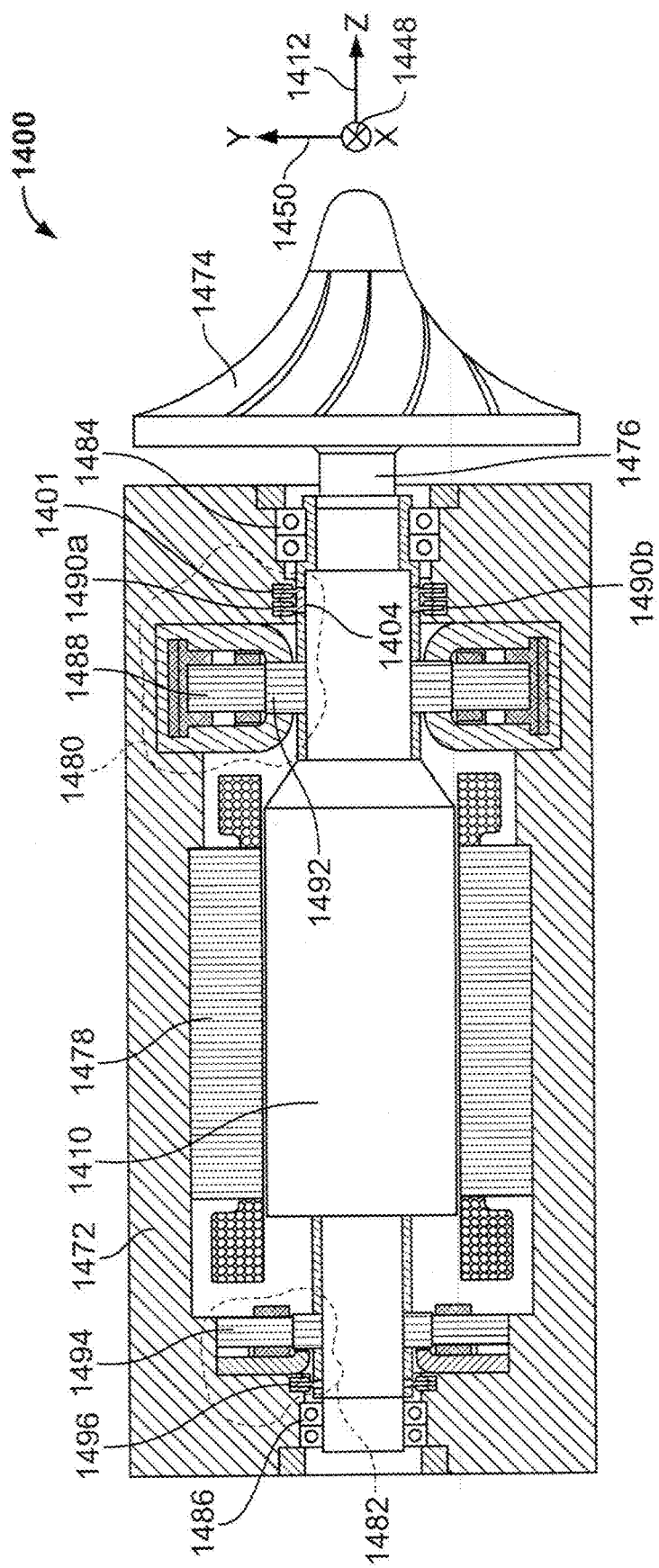
FIG. 14 is a cross-sectional schematic of an electric machine system incorporating an embodiment of the position sensor in accordance with the present disclosure.
Figure 15A:
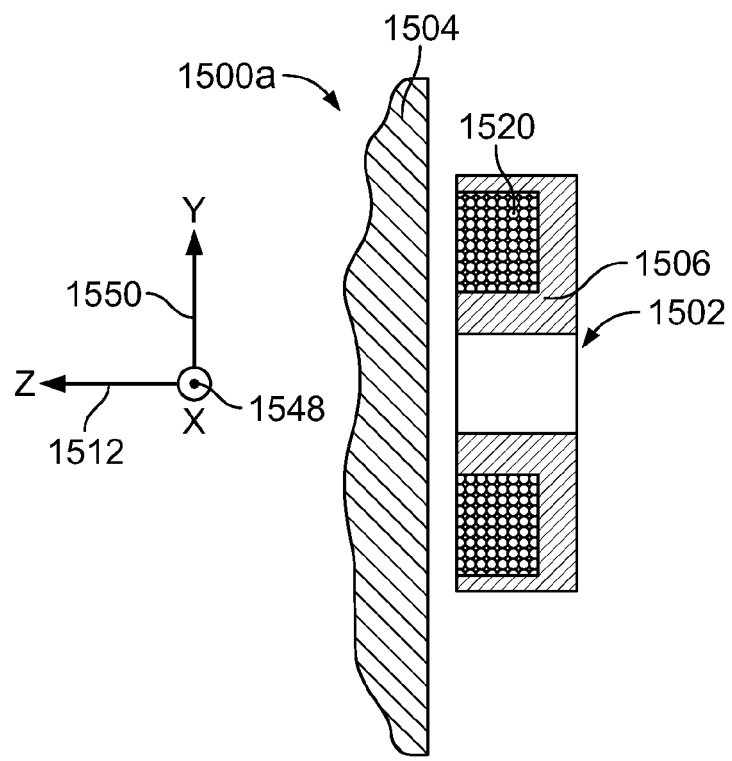
FIGS. 15a-b are schematics illustrating a known configuration for a position sensor.
Figure 15B:
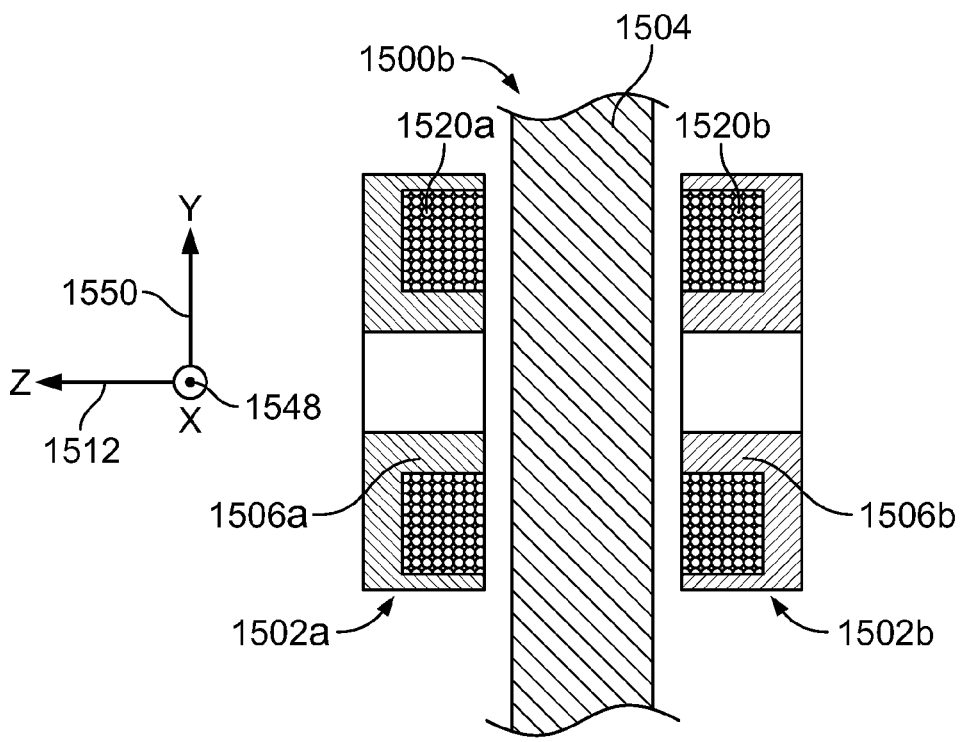
Figure 16A:
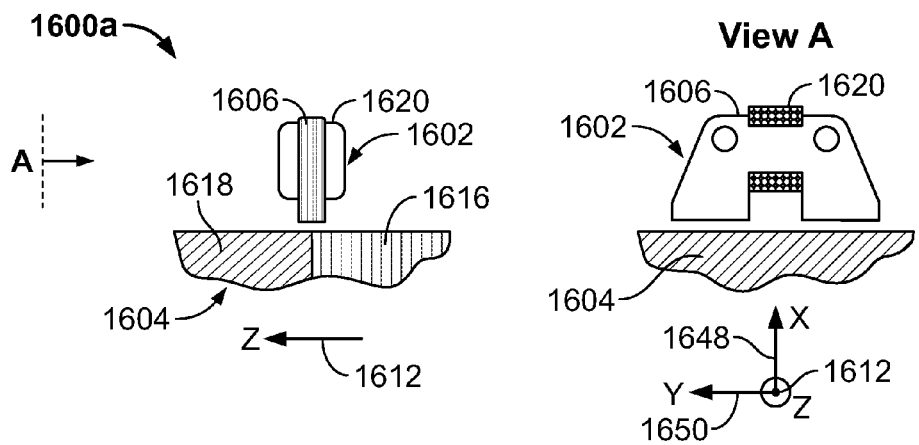
FIGS. 16a-b are schematics illustrating a second known configuration for a position sensor.
Figure 16B:
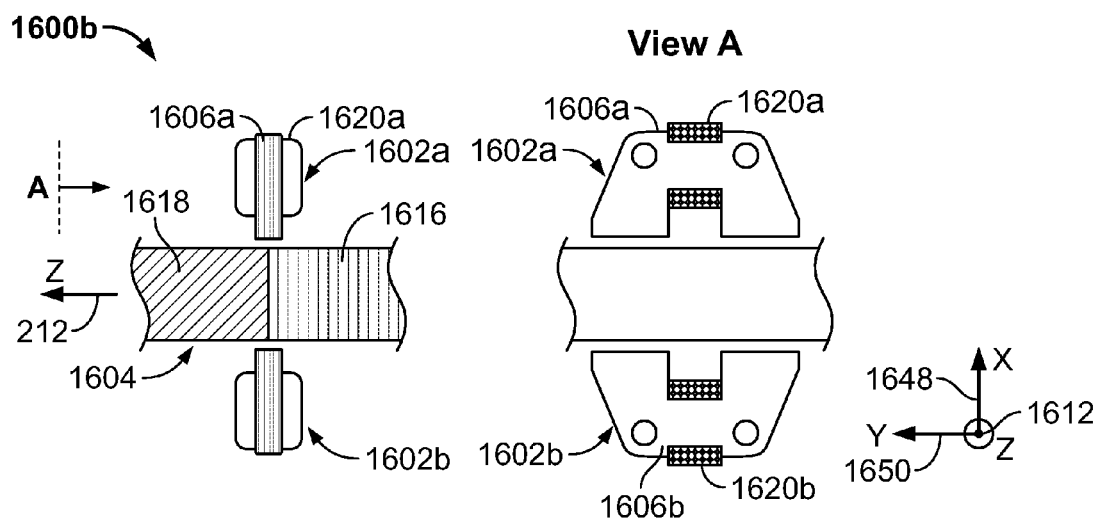

In some aspects, the position sensor 1401 of FIG. 14 may be utilized as a part of an Active Magnetic Bearing (AMB) system to support an object without a mechanical contact. FIG. 14 shows an example of using an AMB system in an electric rotational machine 1400. The rotational electric machine 1400 can be, for example, an electric compressor including an electric motor 1472 driving an impeller 1474 mounted directly on the motor shaft 1476. The electric motor 1472 shown in FIG. 14 has a rotor 1410 and a stator 1478. Alternatively, the impeller 1474 can be driven by a flow of gas or liquid and spin the rotor 1410 attached to it through the shaft 1476. In this case the motor 1472 can be used as a generator that would convert the mechanical energy of the rotor 1410 into electricity. In embodiments, the rotor 1410 of the electric machine 1400 can be supported radially and axially without mechanical contact by front and rear radial AMBs 1480 and 1482. The front AMB 1480 provides an axial suspension of the entire rotor 1410 and a radial suspension of the front end of the rotor, whereas the rear AMB 1482 provides only radial suspension of the rear end of the rotor 1410. When the AMBs 1480 and 1482 are not operating, the rotor can rest on the mechanical backup bearings 1484 and 1486. The front backup bearing 1484 provides the axial support of the entire rotor 1410 and a radial support of the rotor front end, whereas the rear backup bearing 1486 provides only radial support of the rear end of the rotor 1410. There are sufficient radial clearances between the inner diameters of the mechanical backup bearings 1484, 1486 and the outer diameters of the rotor portions interfacing with those bearings to allow the rotor 1410 to be positioned radially without touching the backup bearings 1484, 1486 when the AMBs 1480 and 1482 are activated. Similarly, there may be sufficient axial clearances between the backup bearings 1484, 1486 and the portions of the rotor 1410 interfacing with those bearings to allow the rotor 1410 to be positioned axially without touching the backup bearings 1484 and 1486 when the AMBs 1480 and 1482 are activated.

The front AMB 1480 consists of an electromagnetic actuator 1488, radial position sensors 1490a,b, axial position sensor 1401 and control electronics (not shown). The electromagnetic actuator 1488 is capable of exerting radial and axial forces on the actuator target 1492 firmly mounted on the rotor 1410. The axial force is the force in the direction of Z-axis 1412 and the radial forces are forces in the direction of X-axis 1448 (directed into the page) and the direction of Y-axis 1450. The actuator has three sets of coils corresponding to each of the axes and the forces are produced when the corresponding coils are energized with control currents produced by control electronics (not shown). The position of the front end of the rotor in space is constantly monitored by non-contact position sensors 1490a,b and 1401. The non-contact position sensors 1490a,b monitor radial position of the rotor whereas the position sensors 1401 monitors the axial position of the rotor.

Signals from the position sensors 1490*a,b* and 1401 are input into the control electronics (not shown), which generate currents in the control coils of the electromagnetic actuator 1488 whenever it finds that the rotor is deflected from the desired position such that these currents produce forces pushing the rotor back to the desired position.

The rear AMB 1482 consists of an electromagnetic actuator 1494, radial non-contact position sensors 1496, and control electronics (not shown). It functions identically to the front AMB 1488, except that it does not control the axial position of the rotor 1410 because this function is already performed by the front AMB 1480. Correspondingly, the electromagnetic actuator 1494 may not be able to produce controllable axial force and there may be no axial position sensor.

For industrial applications where the machine is often exposed to dust that can contaminate optics in optical sensors or gaps between electrodes in capacitive sensors, the inductive, reluctance, and eddy-current sensors can be appropriate choices for sensor mechanisms. Inductive, reluctance, and eddy-current sensors can utilize AC electromagnetic fields to detect position of an object. Inductive and reluctance sensors typically utilize a soft-magnetic core such as the sensor head core 106 shown in FIG. 1. The eddy-current sensors typically use a coil without a core or with a low-permeability core. Because soft-magnetic cores increase the impedance of the coils wound around them by several orders of magnitude, the currents induced in a coil with soft-magnetic cores will be several orders of magnitude smaller than the current induced in a coil without soft-magnetic cores when both coils have the same number of turns and are energized by AC voltages of the same amplitudes and the same frequencies. A current in a coil needs to be limited in order to avoid overheating and damaging the coil. This may be done by either increasing the number of turns without reducing the wire section, or by reducing the AC voltage inducing this current, or by increasing the frequency of the AC voltage. Since the possibilities for increasing number of turns are limited by the available design envelope and reducing the voltage amplitude is not possible without sacrificing the signal-to-noise ratio, in sensors without soft-magnetic cores, the currents are limited by increasing the frequency. This, however, also may have negative consequences because at high frequencies impedances of the cables connecting sensor coils to electronics may become comparable with impedances of the coils. Therefore, the length of the connecting cables, presence of intermediate connectors, and how the cables are routed in space, may affect the sensor readings and introduce errors. In addition, sensor electronics design becomes more complicated when the frequencies become larger than several hundreds kilohertz. The eddy-current sensors are typically built without soft-magnetic cores and operate at frequencies in the megahertz range. Therefore, inductive and reluctance noncontact position sensors utilizing soft-magnetic core have an important advantage for application in industrial machines like the one shown in FIG. 14 because their performance is less sensitive to the properties of the connecting wires between the sensor and electronics, which is typically located at a significant distance from the machine, and also because the sensor electronics is less complicated, and, consequently, more reliable and less expensive.

A drawback of using a soft-magnetic core is that the impedance of a sensor coil wound around the core can be affected by external magnetic fields, for example, the leakage fields from the electromagnetic actuator. Because of limitations on the design envelope, the position sensors may be located very close to the electromagnetic actuator and the leakage fields can be very strong. These leakage fields may be less of a problem for the radial sensors in rotational systems because using two diametrically opposite sensor heads in differential connections helps to mitigate the problem. For example, FIG. 14 shows a conventional radial reluctance sensor 1490*a,b* used to measure displacements of the rotor 1410 along the Y-axis 1450 (or, more specifically, the front end of rotor 1410). The sensor consists of two sensor heads 1490*a* and 1490*b* located along the Y-axis 1450 diametrically opposite to each other with respect to the rotational axis Z 1412. In order to measure displacements along the X-axis 1448, two more sensor heads 1490*c* and 1490*d* are needed (not shown). When the sensor target 1404 is displaced along the Y-axis 1450, the impedances of the sensor heads 1490*a* and 1490*b* change in the opposite directions. For example, when the sensor target 1404 is displaced in the positive Y-direction, the impedance of the sensor head 1490*a* increases, whereas the impedance of the sensor head 1490*b* decreases by about the same amount. The sensor electronics in conventional reluctance sensors measure the difference between the impedances of the sensor heads 1490*a* and 1490*b*, and produces an output signal (typically a voltage) proportional to this difference, which is then used to calculate the displacement of the target 1404 in the Y-direction. A leakage from the electromagnetic actuator 1480 changes the reluctances of the sensor heads 1490*a* and 1490*b*, but in the same direction, and, if a deflection of the sensor target 1404 in the Y-direction is not too large, the sensors 1490*a* and 1490*b* will be exposed to about the same leakage fields, due to the field axial symmetry, and they will exhibit the same impedance changes. Since the sensor target displacement is calculated based on the difference between the impedances of the sensor heads 1490*a* and 1490*b*, the measurement error introduced by the leakage field is significantly reduced.

Whereas the leakage field from the electromagnetic actuator 1480 is uniform around the system symmetry axis Z 1412, it is not uniform along the axis Z 1412. Therefore, it is not possible to eliminate the effect of the leakage field on the sensors measuring the rotor displacements in the Z-direction in the same way as it could be done for the sensors measuring radial displacement by placing two sensors in differential connection in two places spaced along the Z-axis and using a difference in their impedances to measure the displacement in the Z-direction. This is because the two sensors will be exposed to different fields and the errors induced by the fields may not cancel each other when the sensor impedances are subtracted. Therefore, in the system shown in FIG. 14, the axial displacements of the rotor can be measured by the sensor 1401 described in this invention as shown in FIG. 2 or FIG. 11, which readings are not affected significantly by the leakage fields.

A number of implementations have been described. Nevertheless, it will be understood that various modifications may be made. Accordingly, other implementations are within the scope of the following claims.

What is claimed is:

1. An apparatus for determining the position of a movable element relative to a stationary element along a measurement axis, the apparatus comprising:
   a sensor head fixed in relation to the stationary element, the sensor head comprising a soft-magnetic core;
   a sensor target fixed in relation to the movable element, the soft-magnetic core and the sensor target separated by an air gap and defining a magnetic circuit;
   a conductive excitation coil coiled around the soft-magnetic core and adapted to produce an AC magnetic flux in the magnetic circuit, the AC magnetic flux corresponding with a total magnetic flux in the air gap, the sensor target comprising different electromagnetic properties at different locations along the measurement axis that causes a distribution of the total magnetic flux in the air gap to change when the sensor target is displaced along the measurement axis;

a magnetic flux density sensor fixed in relation to the sensor head and residing in the air gap between the soft-magnetic core and the sensor target, the magnetic flux density sensor configured to detect magnetic flux density in a portion of the air gap; and a controller in communication with the magnetic flux density sensor, configured to receive an output signal of the magnetic flux density sensor and determine the position of the sensor target along the measurement axis based on two parameters associated with a magnetic flux distribution in the air gap including a value of the total magnetic flux in the air gap and a value of the magnetic flux density in the portion of the air gap detected by the magnetic flux density sensor.

2. The apparatus of claim 1 further comprising a total magnetic flux sensor fixed in relation to the sensor head and configured to sense the total magnetic flux in the air gap between the soft-magnetic core and the sensor target.

3. The apparatus of claim 2, wherein the controller is configured to determine the position of the sensor target along the measurement axis based on a ratio determined from the total magnetic flux in the air gap sensed by the total magnetic flux sensor and the magnetic flux density detected by the magnetic flux density sensor.

4. The apparatus of claim 2, wherein the total magnetic flux sensor is a conductive coil.

5. The apparatus of claim 1, wherein the AC magnetic flux is produced by an AC voltage of constant amplitude applied to the conductive excitation coil, the AC voltage of constant amplitude resulting in the total flux in the air gap being controlled to a known value.

6. The apparatus of claim 5, wherein the controller is configured to determine the position of the sensor target along the measurement axis based on a ratio determined from the total magnetic flux in the air gap of known value and the magnetic flux density detected by the magnetic flux density sensor.

7. The apparatus of claim 1, wherein the magnetic flux density sensor is a conductive coil.

8. The apparatus of claim 1, wherein the magnetic flux density sensor is a Hall Effect sensor.

9. The apparatus of claim 1, wherein the sensor target is divided along the measurement axis into a first portion and a second portion, the first portion and the second portion having different electromagnetic properties.

10. The apparatus of claim 9, wherein the first portion of the sensor target comprises a soft-magnetic, non-conductive material, and the second portion comprises a conductive, non-magnetic material.

11. The apparatus of claim 10, wherein the first portion of the sensor target comprises electrically isolated electrical steel laminations stacked in the measurement direction.

12. The apparatus of claim 1, wherein the soft-magnetic core comprises a nonmagnetic, conductive coating, the nonmagnetic, conductive coating comprising a non-conductive interrupt preventing formation of a closed conductive loop within the coating around the magnetic circuit.

13. The apparatus of claim 1, wherein the sensor target is configured to rotate about the measurement axis.

14. The apparatus of claim 1, wherein the magnetic flux density sensor resides in the air gap proximate an interface between the different locations of the sensor target.

15. An electric machine system comprising
a rotor supported to rotate within a stator; and
a position sensing device for determining the position of the rotor relative to the stator along a measurement axis, the position sensing device comprising:

a sensor head fixed in relation to the stator, the sensor head comprising a soft-magnetic core, a sensor target fixed in relation to the rotor, the soft-magnetic core and the sensor target separated by an air gap and defining a magnetic circuit, the sensor target configured to rotate about the measurement axis, a conductive excitation coil coiled around the soft-magnetic core and adapted to produce an AC magnetic flux in the magnetic circuit, the AC magnetic flux corresponding with a total magnetic flux in the air gap, the sensor target comprising different electromagnetic properties at different locations along the measurement axis that causes a distribution of the total magnetic flux in the air gap to change when the sensor target is displaced along the measurement axis, a magnetic flux density sensor fixed in relation to the sensor head and residing in the air gap between the soft-magnetic core and the sensor target, the magnetic flux density sensor configured to detect magnetic flux density in a portion of the air gap, and a controller in communication with the magnetic flux density sensor, configured to receive an output signal of the magnetic flux density sensor and determine the position of the sensor target along the measurement axis based on two parameters associated with a magnetic flux distribution in the air gap including a value of the total magnetic flux in the air gap and a value of the magnetic flux density in the portion of the air gap detected by the magnetic flux density sensor.

16. The system of claim 15 further comprising a total magnetic flux sensor fixed in relation to the sensor head and configured to sense the total magnetic flux in the air gap between the soft-magnetic core and the sensor target.

17. The system of claim 16, wherein the controller is configured to determine the position of the sensor target along the measurement axis based on a ratio determined from the total magnetic flux in the air gap sensed by the total magnetic flux sensor and the magnetic flux density detected by the magnetic flux density sensor.

18. The system of claim 16, wherein the total magnetic flux sensor is a conductive coil.

19. The system of claim 15, wherein the AC magnetic flux is produced by an AC voltage of constant amplitude applied to the conductive excitation coil, the AC voltage of constant amplitude resulting in the total flux in the air gap being controlled to a known value.

20. The system of claim 19, wherein the controller is configured to determine the position of the sensor target along the measurement axis based on a ratio determined from the total magnetic flux in the air gap of known value and the magnetic flux density detected by the magnetic flux density sensor.

21. The system of claim 15, wherein the magnetic flux density sensor is a conductive coil.

22. The system of claim 15, wherein the magnetic flux density sensor resides in the air gap proximate an interface between the different locations of the sensor target.

23. The system of claim 15, wherein the sensor target is divided along the measurement axis into a first portion and a second portion, the first portion and the second portion having different electromagnetic properties.

24. The system of claim 23, wherein the first portion of the sensor target comprises a soft-magnetic, non-conductive material, and the second portion comprises a conductive, non-magnetic material.

25. The system of claim 24, wherein the first portion of the sensor target comprises electrically isolated electrical steel laminations stacked in the measurement direction.

26. The system of claim 25, wherein the soft-magnetic core comprises a nonmagnetic, conductive coating, the nonmagnetic, conductive coating comprising a non-conductive interrupt preventing formation of a closed conductive loop within the coating around the magnetic circuit.

27. An apparatus for determining the position of a movable element relative to a stationary element along a measurement axis, the apparatus comprising:
 a sensor head fixed in relation to the stationary element, the sensor head comprising a soft-magnetic core;
 a sensor target fixed in relation to the movable element, the soft-magnetic core and the sensor target separated by an air gap and defining a magnetic circuit;
 a conductive excitation coil coiled around the soft-magnetic core and adapted to produce an AC magnetic flux in the magnetic circuit, the AC magnetic flux corresponding with a total magnetic flux in the air gap, the sensor target comprising different electromagnetic properties at different locations along the measurement axis that causes a distribution of the total magnetic flux in the air gap to change when the sensor target is displaced along the measurement axis;
 a magnetic flux density sensor fixed in relation to the sensor head and residing in the air gap between the soft-magnetic core and the sensor target, the magnetic flux density sensor configured to detect magnetic flux density in a portion of the air gap;
 a total magnetic flux sensor fixed in relation to the sensor head and configured to sense the total magnetic flux in the air gap between the soft-magnetic core and the sensor target;
 a controller in communication with the magnetic flux density sensor, configured to receive an output signal of the magnetic flux density sensor and determine the position of the sensor target along the measurement axis based on a ratio determined from the total magnetic flux in the air gap sensed by the total magnetic flux sensor and magnetic flux density detected by the magnetic flux density sensor.

28. An apparatus for determining the position of a movable element relative to a stationary element along a measurement axis, the apparatus comprising:
 a sensor head fixed in relation to the stationary element, the sensor head comprising a soft-magnetic core;
 a sensor target fixed in relation to the movable element, the soft-magnetic core and the sensor target separated by an air gap and defining a magnetic circuit;
 a conductive excitation coil coiled around the soft-magnetic core and adapted to produce an AC magnetic flux in the magnetic circuit, the AC magnetic flux corresponding with a total magnetic flux in the air gap, the sensor target comprising different electromagnetic properties at different locations along the measurement axis that causes a distribution of the total magnetic flux in the air gap to change when the sensor target is displaced along the measurement axis, the AC magnetic flux produced by an AC voltage of constant amplitude applied to the conductive excitation coil, the AC voltage of constant amplitude resulting in the total flux in the air gap being controlled to a known value;
 a magnetic flux density sensor fixed in relation to the sensor head and residing in the air gap between the soft-magnetic core and the sensor target, the magnetic flux density sensor configured to detect magnetic flux density in a portion of the air gap; and
 a controller in communication with the magnetic flux density sensor, configured to receive an output signal of the magnetic flux density sensor and determine the position of the sensor target along the measurement axis based on a ratio determined from the total magnetic flux in the air gap of known value and the magnetic flux density detected by the magnetic flux density sensor.

* * * * *

UNITED STATES PATENT AND TRADEMARK OFFICE
CERTIFICATE OF CORRECTION

PATENT NO. : 8,564,281 B2
APPLICATION NO. : 12/475052
DATED : October 22, 2013
INVENTOR(S) : Alexei Filatov It is certified that error appears in the above-identified patent and that said Letters Patent is hereby corrected as shown below:

In the Claims

In Column 19, In Line 8, In Claim 26, delete "claim 25," and insert -- claim 15, --, therefor.

Signed and Sealed this
Eighteenth Day of February, 2014

Michelle K. Lee
*Deputy Director of the United States Patent and Trademark Office*